(12) United States Patent
Kim et al.

(10) Patent No.: US 9,516,584 B2
(45) Date of Patent: Dec. 6, 2016

(54) METHOD FOR SETTING UP HIGH-SPEED LINK IN WLAN SYSTEM AND DEVICE FOR SAME

(71) Applicant: LG ELECTRONICS INC., Seoul (KR)

(72) Inventors: Suhwook Kim, Anyang-si (KR); Jeongki Kim, Anyang-si (KR); Giwon Park, Anyang-si (KR); Jinsam Kwak, Anyang-si (KR); Kiseon Ryu, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 17 days.

(21) Appl. No.: 14/416,565

(22) PCT Filed: Aug. 19, 2013

(86) PCT No.: PCT/KR2013/007434
§ 371 (c)(1),
(2) Date: Jan. 22, 2015

(87) PCT Pub. No.: WO2014/030894
PCT Pub. Date: Feb. 27, 2014

(65) Prior Publication Data
US 2015/0189577 A1 Jul. 2, 2015

Related U.S. Application Data

(60) Provisional application No. 61/692,710, filed on Aug. 24, 2012.

(51) Int. Cl.
*H04L 1/00* (2006.01)
*H04W 48/16* (2009.01)
*H04W 48/14* (2009.01)
*H04W 76/02* (2009.01)
*H04W 84/12* (2009.01)

(52) U.S. Cl.
CPC ............ *H04W 48/16* (2013.01); *H04W 48/14* (2013.01); *H04W 76/02* (2013.01); *H04W 84/12* (2013.01)

(58) Field of Classification Search
CPC ....... H04L 47/10; H04L 47/11; H04L 47/12; H04L 47/13; H04L 2012/5631; H04L 2012/5632; H04L 2012/5633; H04L 2012/5634; H04W 84/12; H04W 84/13; H04W 84/14; H04W 84/15; H04W 84/16
USPC ................ 370/338, 252, 339, 346, 229, 230
See application file for complete search history.

(56) References Cited

U.S. PATENT DOCUMENTS

2007/0093201 A1* 4/2007 Hsu ...................... H04L 12/189
455/3.04
2009/0046682 A1* 2/2009 Kim ...................... H04W 28/06
370/338
2012/0281609 A1* 11/2012 Kasslin ................. H04W 48/14
370/312

FOREIGN PATENT DOCUMENTS

| KR | 10-2007-0079290 | 8/2007 |
| KR | 10-2010-0021643 | 2/2010 |
| WO | 2012/041401 | 4/2012 |

OTHER PUBLICATIONS

PCT International Application No. PCT/KR2013/007434, Written Opinion of the International Searching Authority dated Dec. 2, 2013, 13 pages.
PCT International Application No. PCT/KR2013/007434, Written Opinion of the International Searching Authority dated Dec. 2, 2013, 10 pages.

* cited by examiner

*Primary Examiner* — Dady Chery
(74) *Attorney, Agent, or Firm* — Lee, Hong, Degerman, Kang & Waimey

(57) ABSTRACT

The present invention relates to a wireless communication system, and more specifically, to a method for setting up a high-speed link in a WLAN system and a device for the same. A method for setting up a high-speed link by a station (STA) in a WLAN system, according to one embodiment of the present invention, can comprise the steps of: transmitting a frame including identification information and/or fragment identification information of a previous access point (AP) from the STA to a current AP; and receiving Generic Advertisement Service (GAS) query response information from the current AP, wherein when the identification information of the previous AP is included in the frame, the GAS query response information can be acquired by the current AP from the previous AP.

20 Claims, 14 Drawing Sheets

(a)

(b)

METHOD FOR SETTING UP HIGH-SPEED LINK IN WLAN SYSTEM AND DEVICE FOR SAME

CROSS-REFERENCE TO RELATED APPLICATIONS

This application is the National Stage filing under 35 U.S.C. 371 of International Application No. PCT/KR2013/007434, filed on Aug. 19, 2013, which claims the benefit of U.S. Provisional Application Ser. No. 61/692,710, filed on Aug. 24, 2012, the contents of which are all hereby incorporated by reference herein in their entirety.

TECHNICAL FIELD

The following descriptions relate to a wireless communication system and, more specifically, to a method and apparatus for transmitting/receiving neighboring network information.

BACKGROUND ART

With the growth of information communication technology, various wireless communication technologies are under development. Among the wireless communication technologies, wireless local area network (WLAN) technology enables wireless Internet access at home or in offices or specific service provision areas using a mobile terminal such as a personal digital assistant (PDA), laptop computer, portable multimedia player (PMP) or the like on the basis of radio frequency technology.

To overcome the limitations of communication rate, which have been cited as a weak point of WLAN, recent technical standards have introduced systems with increased network rate and reliability and extended wireless network coverage. For example, IEEE 802.11n supports high throughput (HT) of a data rate of 540 Mbps or higher and introduces MIMO (Multiple Input Multiple Output) technology which uses multiple antennas for both a transmitter and a receiver in order to minimize a transmission error and optimize a data rate.

IEEE 802.11ai is developed as a new standard for supporting fast initial link setup for stations (STAs) that support IEEE 802.11 at a MAC (Medium Access Control) layer of IEEE 802.11 systems. IEEE 802.11ai aims to provide technologies for supporting high-speed link setup in a situation in which so many people leave previously connected WLAN coverage and substantially simultaneously access a new WLAN in the case of public transportation transfer, for example. In addition, IEEE 802.11ai has characteristics of security framework, IP address assignment, fast network discovery, etc.

DISCLOSURE

Technical Problem

Technology providing fast link setup (or fast session setup) is required when many users substantially simultaneously attempt network access or a very large number of terminals substantially simultaneously a random access procedure, as described above. However, a detailed scheme for fast link setup has not yet been provided.

An object of the present invention devised to solve the problem lies in a method for remarkably decreasing a time required for a generic advertisement service (GAS) procedure by optimizing the GAS procedure and the like, and increasing speeds thereof for fast link setup.

The technical problems solved by the present invention are not limited to the above technical problems and those skilled in the art may understand other technical problems from the following description.

Technical Solution

In one technical aspect of the present invention, provided herein is a method of performing a high-speed link setup, which is performed by a station (STA) in a wireless communication system, the method including the steps of transmitting from the STA a frame including at least one of identification information of a previous access point (AP) or fragment identification information to a current access point (AP) and receiving a GAS (generic advertisement service) query response information from the current AP, wherein if the identification information of the previous AP is included in the frame, the GAS query response information is obtained from the previous AP by the current AP.

In another technical aspect of the present invention, provided herein is a method of supporting a high-speed link setup, which is supported for a station (STA) by an access point (AP) in a wireless communication system, the method including the steps of receiving a frame including at least one of identification information of a previous access point (AP) or fragment identification information from the STA to the AP and transmitting a GAS (generic advertisement service) query response information to the STA from the AP, wherein if the identification information of the previous AP is included in the frame, the AP obtains the GAS query response information from the previous AP.

In further technical aspect of the present invention, provided herein is in a station (STA) device performing a high-speed link setup in a wireless communication system, a high-speed link setup STA device, including a transceiver and a processor configured to transmit a frame including at least one of identification information of a previous access point (AP) or fragment identification information to a current access point (AP) using the transceiver, the processor configured to receive a GAS (generic advertisement service) query response information from the current AP using the transceiver, wherein if the identification information of the previous AP is included in the frame, the GAS query response information is obtained from the previous AP by the current AP.

In another further technical aspect of the present invention, provided herein is in an access point (AP) device supportive of a high-speed link setup of a station (STA) in a wireless communication system, a high-speed link setup AP device, including a transceiver and processor configured to receive a frame including at least one of identification information of a previous access point (AP) or fragment identification information from the STA using the transceiver, the processor configured to transmit a GAS (generic advertisement service) query response information to the STA using the transceiver, herein if the identification information of the previous AP is included in the frame, the GAS query response information is obtained from the previous AP by the AP.

The following matters may be included in the above technical aspects of the present invention.

If the fragment identification information indicates that at least one subsequent GAS query response fragment exists, the STA may receive the subsequent at least one GAS query response information fragment from the current AP.

Information indicating a prescribed portion of the GAS query response information transmitted to the STA by the previous AP may be obtained by the current AP and wherein the STA receives the rest of the GAS query response information except the prescribed portion from the current AP.

If the identification information of the previous AP is not included in the frame, the GAS query response information may be obtained from an advertisement server (AS) by the current AP.

Before the STA discovers the current AP, the STA may transmit a GAS initial request frame to the previous AP and receive a GAS initial response frame from the previous AP.

If determining that the STA has moved away from an area of the previous AP before completing a reception of the GAS query response information from the previous AP, the STA may transmit the frame to the current AP.

It may be determined the STA has moved away from the area of the previous AP in one of a case of failing to receive a GAS comeback response frame in response to a GAS comeback request frame transmitted by the STA to the previous AP, a case of failing to receive a response to a management frame or a data frame transmitted by the STA to the previous AP, a case of failing to discover the previous AP through an active scanning or a passive scanning, and a case of being notified from a network that the STA has moved away from the area of the previous AP.

The identification information of the previous AP may include an address of the previous AP.

The fragment identification information may include a GAS query response fragment identification information received by the STA from the previous AP.

The frame may include one of a probe request fame, a GAS initial request frame and a GAS comeback request frame.

The AP and the previous AP may belong to a same extension service set (ESS).

The GAS query response information may include ANQP (Access Network Query Protocol) information.

The above description and the following detailed description of the present invention are exemplary and are for additional explanation of the invention disclosed in the claims.

Advantageous Effects

According to the present invention, it is possible to provide a method and an apparatus for remarkably decreasing a time required for a GAS procedure by optimizing the GAS procedure and the like, and increasing speeds thereof, thereby performing or supporting fast link setup.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
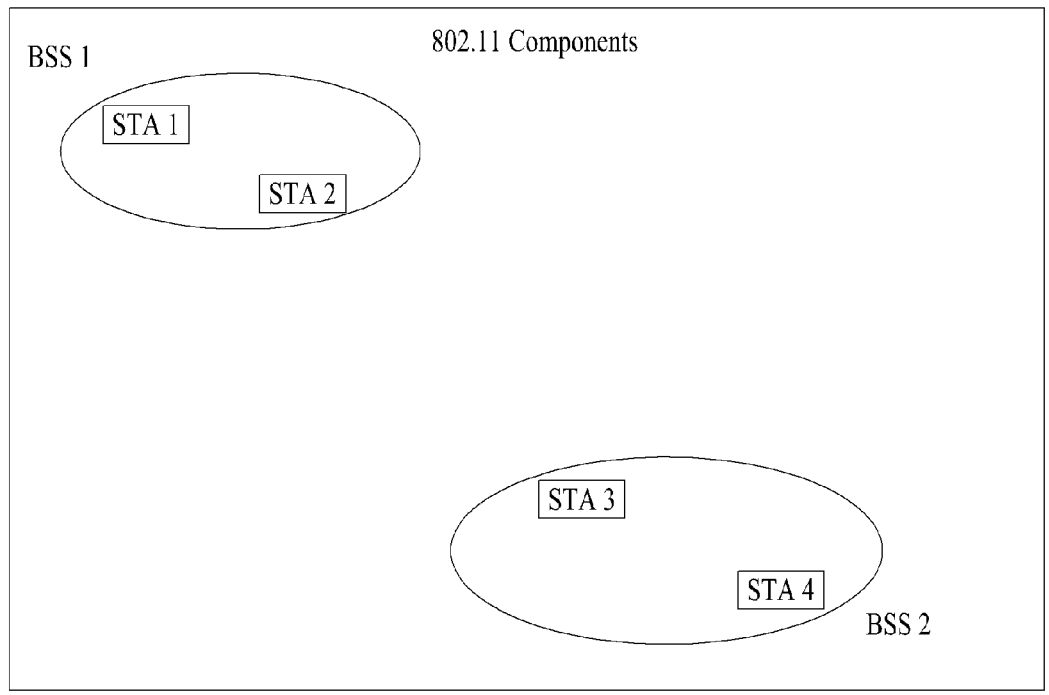
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

Configuration of WLAN System

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
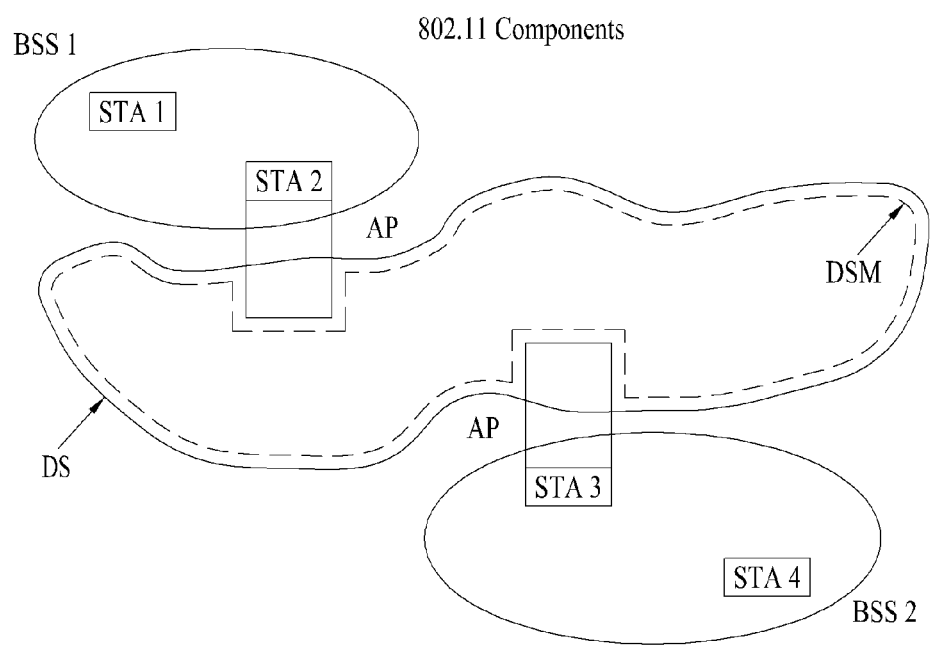
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance there between may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
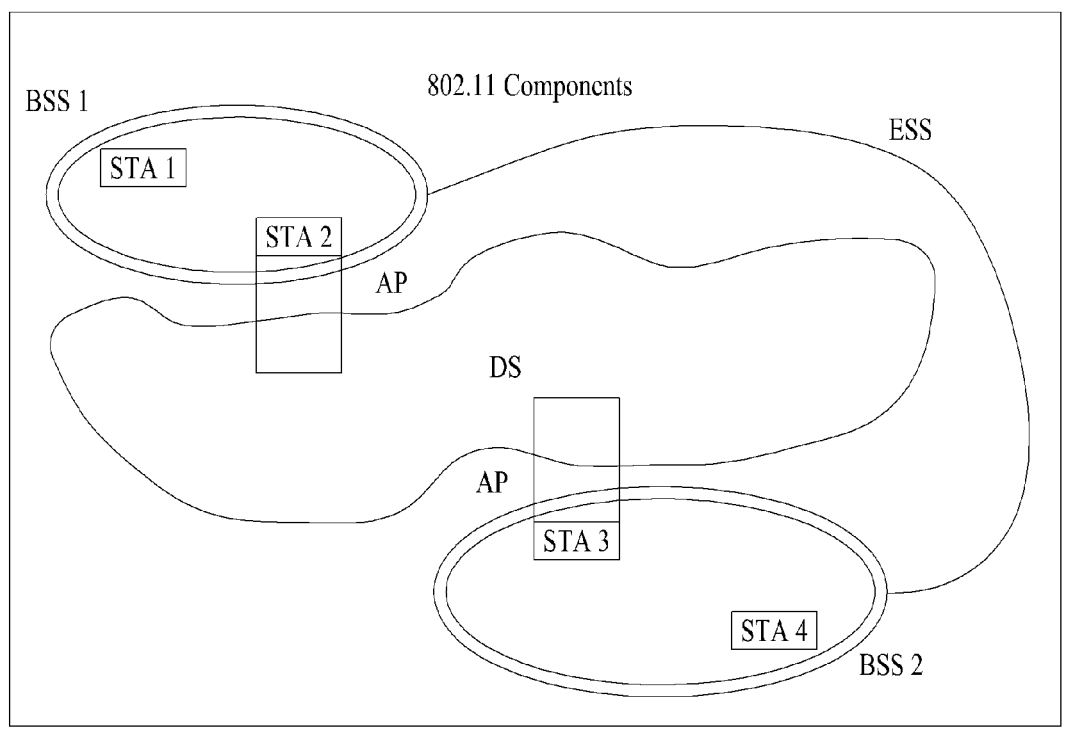
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
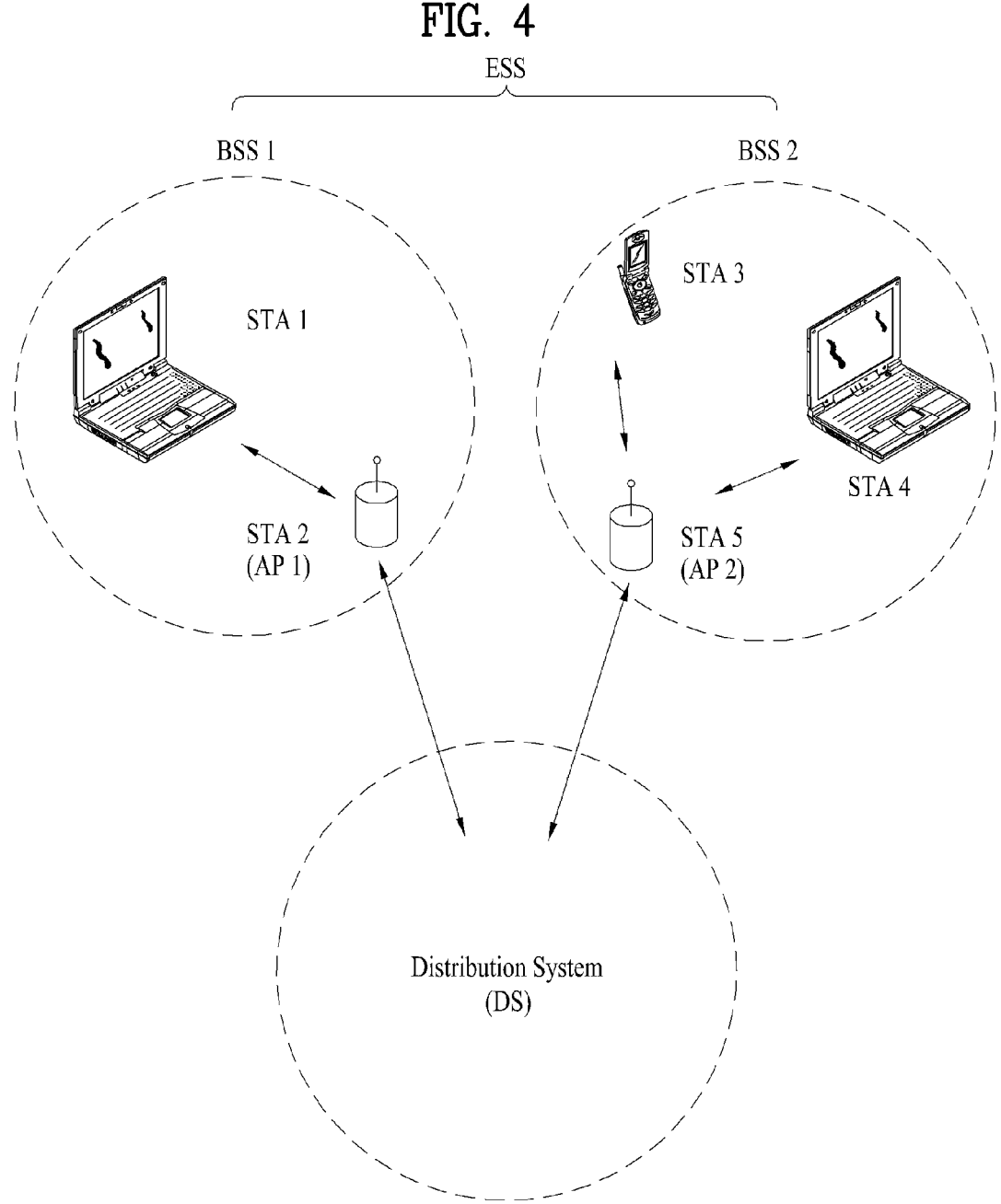
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc. in other wireless communication fields.

Link Setup Procedure

Figure 5:
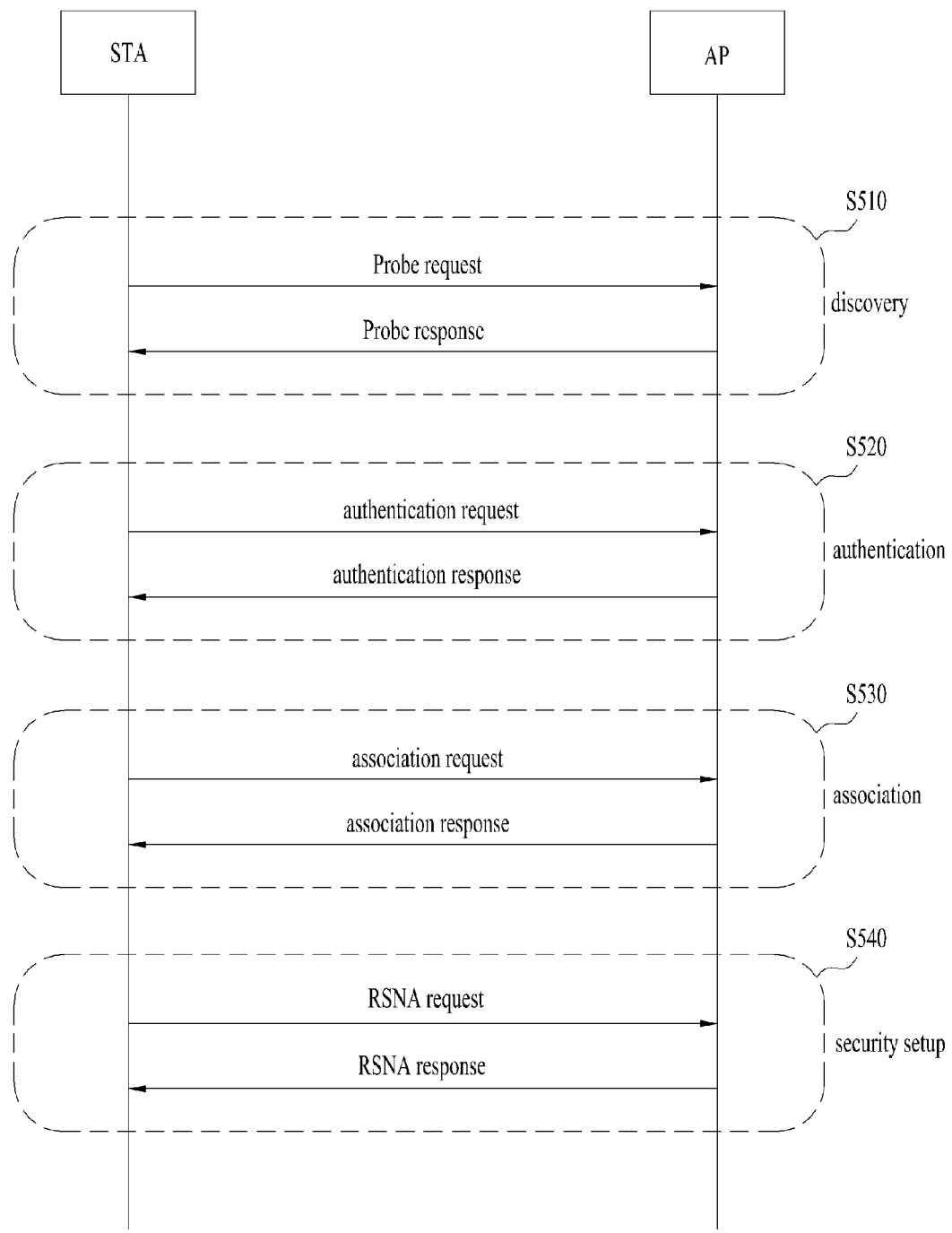
FIG. 5 illustrates a general link setup procedure.

FIG. 5 illustrates a general link setup procedure.

To sets up a link to a network and transmit/receive data, an STA needs to discover the network, perform authentication, establish association and pass through an authentication procedure for security. The link setup procedure may be called a session initiation procedure and a session setup procedure. In addition, discovery, authentication, association and security establishment of the link setup procedure may be called an association procedure.

An exemplary link setup procedure will now be described with reference to FIG. 5.

The STA may discover a network in step S510. Network discovery may include a scanning operation of the STA. That is, the STA needs to discover a network that can participate in communication in order to access the network. The STA needs to identify a compatible network prior to participating in a wireless network. A procedure of identifying a network present in a specific area is referred to as scanning.

Scanning includes active scanning and passive scanning.

FIG. 5 illustrates network discovery operation including active scanning. The STA performing active scanning transmits a probe request frame in order to search surrounding APs while changing channels and waits for a response to the probe request frame. A responder transmits a probe response frame in response to the probe request frame to the STA. Here, the responder may be an STA that has finally transmitted a beacon frame in a BSS of a channel being scanned. An AP corresponds to a responder in a BSS since the AP transmits a beacon frame, whereas a responder is not fixed in an IBSS since STAs in the IBSS transmit a beacon frame in rotation. For example, an STA, which has transmitted a probe request frame on channel #1 and has received a probe response frame on channel #1, may store BSS related information included in the received probe response frame, move to the next channel (e.g. channel #2) and perform scanning (i.e. probe request/response transmission and reception on channel #2) in the same manner.

The scanning operation may be performed in a passive manner, which is not shown in FIG. 5. An STA performing passive scanning waits for a beacon frame while changing channels. The beacon frame, one of management frames in IEEE 802.11, indicates presence of a wireless network and is periodically transmitted to the STA performing scanning to enable the STA to discover and participate in the wireless network. An AP periodically transmits the beacon frame in the BSS, whereas STAs in the IBSS transmit the beacon frame in rotation in the case of IBSS. Upon reception of the beacon frame, the STA performing scanning stores information about the BSS, included in the beacon frame, and records beacon frame information in each channel while moving to another channel. The STA that has received the beacon frame may store BSS related information included in the received beacon frame, move to the next channel and perform scanning on the next channel through the same method.

Comparing active scanning with passive scanning, active scanning has advantages of smaller delay and lower power consumption than passive scanning.

Upon discovery of the network, authentication may be performed on the STA in step S520. This authentication procedure may be referred to as first authentication to be discriminated from security setup operation of step S540, which will be described later.

Authentication includes a procedure through which the STA transmits an authentication request frame to the AP and a procedure through which the AP transmits an authentication response frame to the STA in response to the authentication request frame. An authentication frame used for authentication request/response corresponds to a management frame and may include information as shown in Table 1.

TABLE 1

| Order | Information | Notes |
|---|---|---|
| 1 | Authentication algorithm number | |
| 2 | Authentication transaction sequence number | |
| 3 | Status code | The status code information is reserved in certain Authentication frames. |
| 4 | Challenge text | The challenge text element is present only in certain Authentication frames. |
| 5 | RSN | The RSNE is present in the FT Authentication frames. |
| 6 | Mobility Domain | The MDE is present in the FT Authentication frames. |
| 7 | Fast BSS Transition | An FTE is present in the FT Authentication frames. |
| 8 | Timeout Interval (reassociation deadline) | A Timeout Interval element (TIE) containing the reassociation deadline interval is present in the FT Authentication frames. |
| 9 | RIC | A Resource Information Container, containing a variable number of elements, is present in the FT Authentication frames. |

TABLE 1-continued

| Order | Information | Notes |
|---|---|---|
| 10 | Finite Cyclic Group | An unsigned integer indicating a finite cyclic group. This is present in SAE authentication frames |
| 11 | Anti-Clogging Token | A random bit-string used for anti-clogging purposes. This is present in SAE authentication frames. |
| 12 | Send-Confirm | A binary encoding of an integer used for anti-replay purposes. This is present in SAE authentication frames |
| 13 | Scalar | An unsigned integer encoded. This is present in SAE authentication frames |
| 14 | Element | A field element from a finite field encoded. This is present in SAE authentication frames |
| 15 | Confirm | An unsigned integer encoded. This is present in SAE authentication frames |
| Last | Vendor Specific | One or more vendor-specific elements are optionally present. These elements follow all other elements. |

In Table 1, the authentication algorithm number field indicates a single authentication algorithm, and has a length of 2 octets. For example, authentication algorithm number field values 0, 1, 2 and 3 respectively indicate an open system, a shared key, fast BSS transition and simultaneous authentication of equals (SAE).

The authentication transaction sequence number field indicates a current status from among multiple transaction steps and has a length of 2 octets.

The status code field is used in a response frame, indicates success or failure of a requested operation (e.g. authentication request) and has a length of 2 octets.

The challenge text field includes a challenge text in authentication exchange and has a length determined according to authentication algorithm and transaction sequence number.

The RSN (Robust Security Network) field includes cipher related information and has a length of up to 255 octets. An RSNE (RSN Element) is included in an FT (Fast BSS Transition) authentication frame. The mobility domain field includes mobility domain identifier MD ID, FT capability and policy fields and may be used for an AP to advertise an AP group (i.e. a set of APs that form a mobility domain) to which the AP belongs. The fast BSS transition field includes information necessary to perform an FT authentication sequence during fast BSS transition in an RSN. The timeout interval field includes a re-association deadline interval. The resource information container (RIC) field refers to a set of one or more elements related to a resource request/response and may include a varying number of elements (i.e. elements indicating resources).

The finite cyclic group field indicates a cryptographic group used in SAE exchange and has an unsigned integer value indicating a finite cyclic group. The anti-clogging token field is used for SAE authentication for protection against denial-of-service and is composed of a random bit string. The send-confirm field is used for response prevention in SAE authentication and has a binary coded integer. The scalar field is used for exchange cipher related information in SAE authentication and has an encoded unsigned integer. The element field is used for exchange of a finite field element in SAE authentication. The confirm field is used to verify possession of an encryption key in SAE authentication and has an encoded unsigned integer.

The vendor specific field may be used for vendor-specific information that is not defined in IEEE 802.11.

Table 1 shows some information that may be included in an authentication request/response frame and the authentication request/response frame may further include additional information.

The STA may transmit the authentication request frame including one or more fields shown in Table to the AP. That AP may determine to permit authentication of the STA on the basis of information included in the received authentication request frame. The AP may provide an authentication result to the STA through the authentication response frame including one or more fields shown in Table 1.

Upon successful authentication of the STA, association may be performed in step S530. Association includes a procedure through which the STA transmits an association request frame to the AP and a procedure through which the AP transmits an association response frame to the STA in response to the association request frame.

For example, the association request frame may include information related to various capabilities, a beacon listen interval, a service set identifier (SSID), supported rates, supported channels, RSN, mobility domain, supported operating classes, TIM (Traffic Indication Map) broadcast request, interworking service capability, etc.

For example, the association response frame may include information related to various capabilities, a status code, AID (Association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameter, TIM broadcast response, QoS map, etc.

The aforementioned information is part of information that may be included in the association request/response frame and additional information may be further included in the association request/response frame.

Upon successful association of the STA with the network, security setup may be performed in step S540. Security setup in step S540 may be regarded as authentication through an RSNA (Robust Security Network Association) request/response. Authentication of step S520 may be referred to as first authentication and security setup of step S540 may be referred to as authentication.

Security setup of step S540 may include private key setup through 4-way handshaking using an EAPOL (Extensible Authentication Protocol over LAN) frame. In addition, security setup may be performed according to a security scheme that is not defined in IEEE 802.11.

Figure 6:
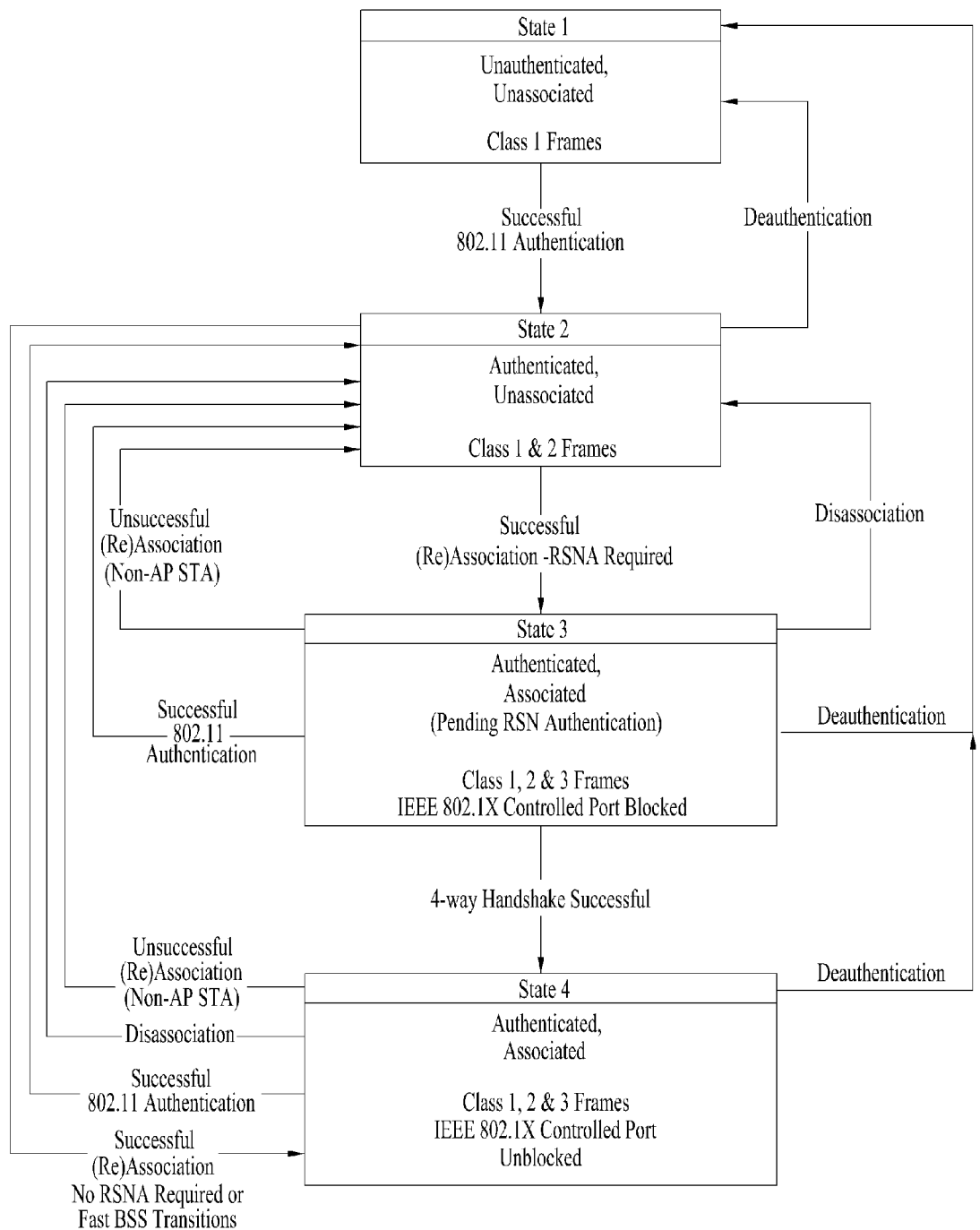
FIG. 6 illustrates state transition of an STA.

FIG. 6 illustrates the concept of state transition of an STA. FIG. 6 shows only events causing state transition for clarity.

State 1 is an unauthenticated and unassociated state of the STA. The STA in this state can transmit/receive class-1 frames only to/from other STAs. The class-1 frames include management frames such as a probe request/response frame, beacon frame, authentication frame, deauthentication frame and the like, for example.

Upon successful authentication of the STA in state 1 (e.g. authentication corresponding to S520 of FIG. 5), station 1 is changed to state 2. That is, state 2 is an authenticated but unassociated state. The STA in state 2 can transmit/receive class-1 and class-2 frames only to/from other STAs. The class-2 frames include management frames such as an association request/response frame, re-association request/response frame, disassociation frame and the like, for example.

When the STA in state 2 is deauthenticated, state 2 is changed to state 1. When the STA in state 2 is successfully associated and RSNA is not required or in the case of fast BSS transition, state 2 is directly changed to state 4.

Upon successful association (or re-association) of the STA in state 2, state 2 is changed to state 3. That is, state 3 is an authenticated and associated state in which RSNA authentication (e.g. security setup corresponding to step S540 of FIG. 5) is not completed. While the STA can transmit/receive class-1, 2 and 3 frames to/from other STAs in state 3, an IEEE 802.1x control port is blocked. Class-3 frames include management frames such as a data frame, action frame and the like and control frames such as a block ACK frame and the like, transmitted/received in an infrastructure BSS.

When the STA is disassociated or fails to be associated in state 3, state 3 is returned to state 2. When the STA is deauthenticated in state 3, state 3 is returned to state 1.

Upon successful 4-way handshaking of the STA in state 3, state 3 is changed to state 4. In state 4, the STA is authenticated and associated and thus can transmit class-1, 2 and 3 frames, and the IEEE 802.1x control port is unblocked.

When the STA is disassociated or fails to be associated in state 4, state 4 is returned to state 2. When the STA is deauthenticated in state 4, state 4 is returned to state 1.

GAS (Generic Advertisement Service) Procedure

A method of advertising an access network type (e.g. private network, free network, charged network, etc.), roaming consortium, location information and the like is used for an STA to discover and select an appropriate network prior to association with an AP (e.g. a system according to IEEE 802.11u standards). In addition, GAS that enables an STA to transmit/receive an advertisement protocol frame (e.g. second layer (Layer 2) or MAC frame) to/from a network server prior to authentication may be used. According to GAS, an AP may function to relay a query of the STA to a network server (e.g. advertisement server (AS)) and to transmit a response from the network server to the STA.

Moreover, in order for an STA to obtain various information of a desired network, ANQP (Access Network Query Protocol) can be used. In particular, the ANQP may be a protocol as follows. First of all, an STA makes a request for a desired information to an AS. Secondly, the AS provides the STA with the desired information. For the ANQP, GAS protocol is used. Table 2 in the following summarizes ANQP usages defined in IEEE 802.11u Document.

TABLE 2

| Info Name | ANQP Info Element (clause) | Element Type | BSS AP | Non-AP STA | IBSS STA |
|---|---|---|---|---|---|
| ANQP Query list | 7.3.4.1 | S | T, R | T, R | T, R |
| ANQP Capability list | 7.3.4.2 | Q | T, R | T, R | T, R |
| Venue Name information | 7.3.4.3 | S | T | R | — |

TABLE 2-continued

| Info Name | ANQP Info Element (clause) | Element Type | BSS AP | Non-AP STA | IBSS STA |
|---|---|---|---|---|---|
| Emergency Call Number information | 7.3.4.4 | S | T | R | — |
| Network Authentication Type information | 7.3.4.5 | S | T | R | — |
| Roaming Consortium list | 7.3.4.6 | S | T | R | — |
| ANQP vendor-specific list | 7.3.4.7 | Q, S | T, R | T, R | T, R |
| IP Address Type Availability information | 7.3.4.8 | S | T, R | T, R | T, R |
| NAI Realm list | 7.3.4.9 | S | T | R | T, R |
| 3GPP Cellular Network information | 7.3.4.10 | S | T | R | — |
| AP Geospatial Location | 7.3.4.11 | S | T | R | T, R |
| AP Civic Location | 7.3.4.12 | S | T | R | T, R |
| The AP Location Public Identifier URI | 7.3.4.13 | S | T | R | T, R |
| Domain Name list | 7.3.4.14 | S | T | R | — |
| Emergency Alert Identifier URI | 7.3.4.15 | S | T | R | T, R |
| Emergency NAI | 7.3.4.16 | S | T | R | — |

Symbols
Q element is an ANQP Query
S element is an ANQP Response
T ANQP element may be transmitted by MAC entity
R ANQP element may be received by MAC entity
— ANQP element is neither transmitted nor received by MAC entity Table 2 shows one example only, by which ANQP usages are non-limited. Moreover, details of the ANQP examples included in Table 2 can refer to the standard document IEEE 802.11u.

Thus, it is able to make a request for information on an access network desired by an STA in a manner that ANQP is indicated in a GAS query frame. Hence, an STA is able to obtain network service information (e.g., service information provided by IBSS, local access service, available subscription service provider, external network information, etc.) failing to be provided in a beacon frame or a probe response frame.

Figure 7:
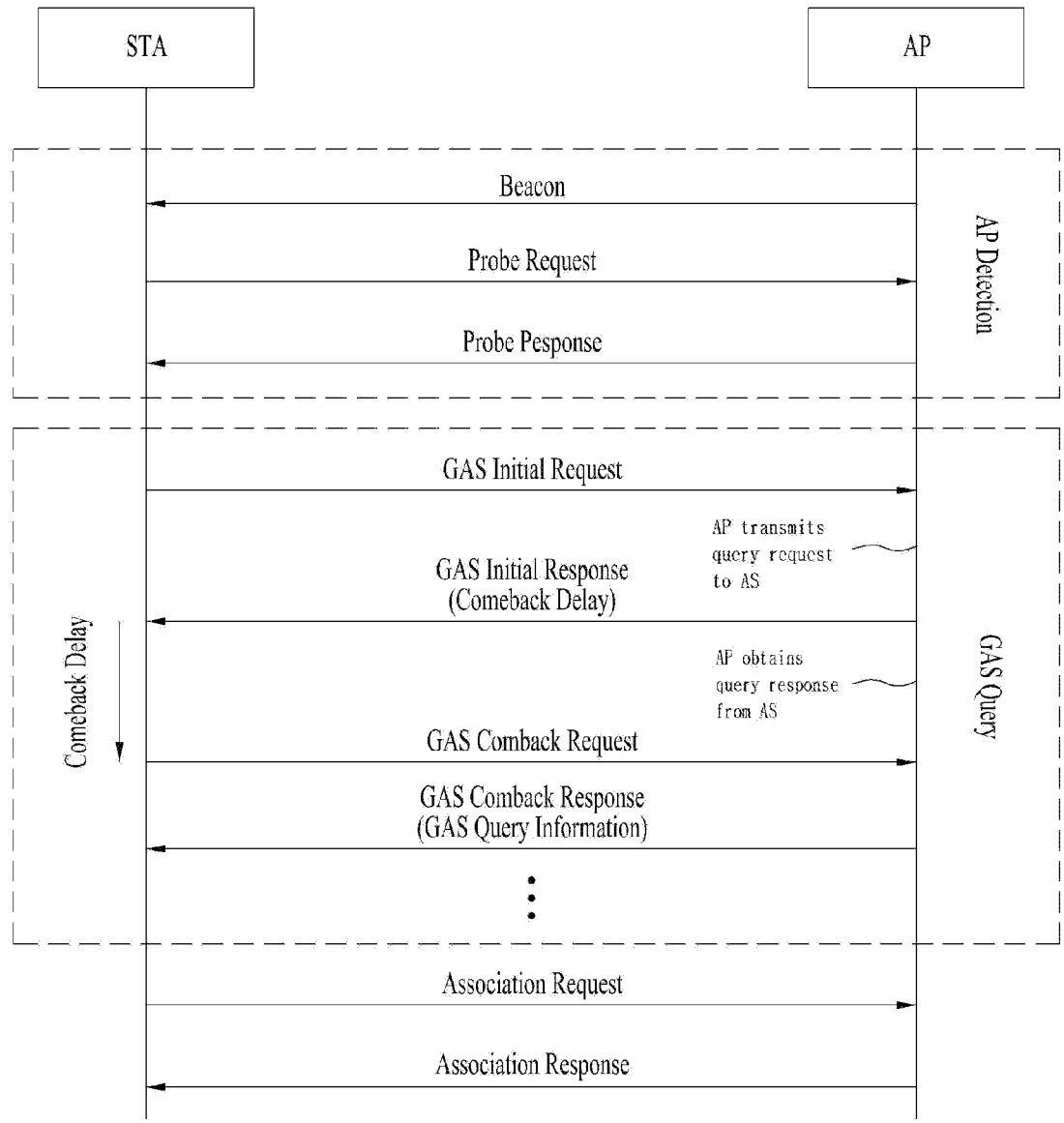
FIG. 7 illustrates a GAS procedure.

FIG. 7 is a diagram to describe a GAS process.

An STA is able to detect an AP by performing a passive scanning of receiving a beacon frame or an active scanning of transmitting a probe request frame and then receiving a frame response frame. In the beacon frame or the probe response frame, such information as an interworking element, a roaming consortium element and the like can be included.

In order to obtain additional information of a desired network after the AP detection, the STA can transmit a GAS initial request frame to the AP. In the GAS initial request frame, a dialog token, a request IE and the like may be included. Hence, the AP can deliver a GAS query request to an advertisement server (AS). If the AP obtains a query response from the AS within a prescribed time (e.g., before a timing point for transmitting a Query response to the STA), the AP can provide the information requested by the STA through a GAS initial response frame in response to the GAS initial request frame.

If the AP fails to obtain a query response from the AS within a prescribed time, when the AP transmits the GAS initial response frame to the STA, the AP can control a dialog token, a comeback delay information and the like to be included in the GAS initial response frame. A time indicated by the comeback delay may amount to several minutes or less for example.

Hence, after the STA has stood by for the comeback delay, the STA can transmit a GAS comeback request frame including the dialog token to the AP. Meanwhile, while the STA stands by for the comeback delay, the AP may receive a GAS query response from the AS. Accordingly, in response to the GAS comeback request from the STA, when the AP transmits a GAS comeback response frame, a dialog token, a GAS query information and the like can be included in the GAS comeback response frame.

Having obtained the information of the network through the GAS query operation, the STA can subsequently associated with the AP of the corresponding network.

Enhanced GAS Process

As mentioned in the foregoing description, according to the ANQP, an STA makes a request for a query to an AS through an AP and obtains network information (or ANQP information.

In this case, a communication speed between the AP and the AS is slower than a communication speed between the STA and the AP. According to the example shown in FIG. 7, a time taken for the AP to receive a query response from the AS after transmitting a query request to the AS is considerably long. Hence, after the AP has received a GAS initial request from the STA, while the AP fails to obtain the query response from the AS, the AP instructs the STA to perform a GAS comeback delay.

Moreover, in case that the STA discovers a new network, since a size of network information, which is to be obtained through ANQP, is large, it is unable to deliver all network information through a single GAS request/response process. Hence, as the GAS request/response process is performed between the AP and the STA several times, the STA can obtain the network information.

Thus, according to the existing ANQP, it takes a considerable time until the STA obtains a requested network information. Moreover, since it takes a considerable time for the AP to receive network information from the AS, the STA should stand by for a comeback delay. In case that a size of the network information is large, since the GAS comeback request/response process should be performed several times, a consumed time increases as well.

Moreover, after an STA has made a request for network information to a prescribed AP, the STA may move away from a coverage (or area) of the AP before receiving the corresponding network information. In this case, the STA should start the ANQP process through a new AP all over again. Hence, as the ANQP process fails, a time taken for the STA to obtain network information increases as many as the failing ANQP process and a power consumption of the STA increases as well. Moreover, since a resource used for a GAS frame transmission is eventually wasted, overall network performance is lowered.

To solve the above problems, the present invention proposes an enhanced GAS protocol operation.

Items proposed by the present invention assume the following environments.

APs in a single ESS can communicate with each other and a communication speed between APs is fast enough.

A communication speed between AP and AS is slower than a communication speed between APs within a single ESS. And, a time taken for the AP to receive network information from the AS is considerably long.

STA can move away from a coverage of a single AP during an ANQP process.

Moreover, an enhanced GAS protocol operation proposed by the present invention is preferably applicable to a situation as follows. First of all, a plurality of APs belong to a single ESS. Secondly, user's mobility is high.

For instance, as an environment, in which many public APs are installed, with very high user density and mobility, it is able to consider a bus terminal, a train station, a subway station, an airport or the like. For instance, APs installed in a terminal, station or airport frequently belong to a single ESS and the APs can communicate with each other. Moreover, since an STA of a user entering/leaving a terminal, station or airport frequently enters a new network, it is able to expect that a size of information supposed to be received from an AS through ANQP will be considerable. For instance, right after numerous users have got off, an STA may be connected to an AP nearby a gate and obtains network information according to a GAS protocol. In doing so, the STA may move to another place such as a toilet, a store or the like or may move in a different gate direction for transit. In this case, since the STA mostly communicates with an initially entered AP for a short time only and then moves away from the corresponding AP, it may frequently occur that the STA fails to obtain new network information sufficiently.

For another instance, as an environment, in which a plurality of APs configuring a single ESS are installed, with very high user density and mobility, it is able to consider a place such as a shopping mall or the like. For example, while numerous users are obtaining current information on a shopping mall at a shopping mall entrance through AP by ANQP, it may frequently occur that the users move away from a coverage of the corresponding AP to other destinations.

For further instance, as an environment, in which a plurality of APs configuring a single ESS are installed, with very high user density and mobility, it is able to consider a place such as a college campus or the like. For example, while numerous users are obtaining information on a lecture through an AP of a user-staying classroom by ANQP, it may frequently occur that the users move away from a coverage of the corresponding AP to other classrooms, a restaurant and the like.

In such a situation, if an enhanced GAS protocol operation proposed by the present invention is applied, power and radio resource wastes can be minimized and a desired network information can be provided/obtained more quickly.

Prior to describing a proposal of the present invention, an existing GAS protocol operation is described as follows.

Figure 8:
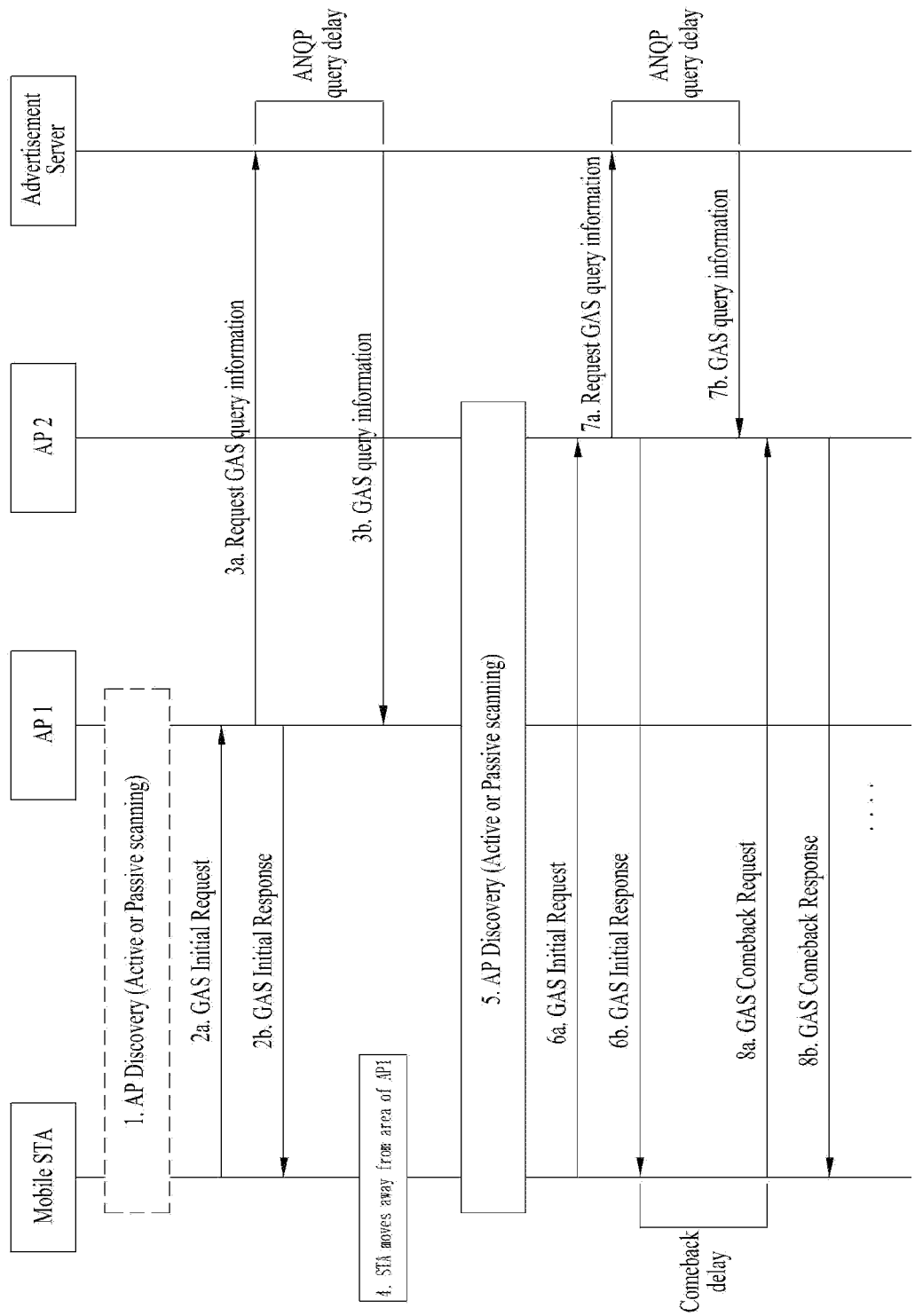
FIG. 8 is a diagram to describe one example of an existing GAS protocol operation in case that an STA moves.

FIG. 8 is a diagram to describe one example of an existing GAS protocol operation in case that an STA moves.

In a step 1 of FIG. 8, a mobile STA can detect an AP 1 through a network discovery operation (e.g., active scanning, passive scanning, etc.).

In a step 2a of FIG. 8, the mobile STA can transmit a GAS initial request frame to the AP 1 to request network information. In a step 2b, in response to the GAS initial request frame, the AP 1 is able to transmit a GAS initial response frame to the mobile STA. Assume that a time taken for the step 2a and the step 2b amounts to about several microseconds (μs).

While the GAS initial request/response process is performed between the AP 1 and the STA, if the AP 1 receives the GAS initial request frame from the STA, in a step 3a, the AP 1 is able to transmit a GAS query information request to an advertisement server (AS). Hence, in a step 3b, the AS can inform the AP 1 of GAS query information. A time taken for the AP to receive network information from the AS can be named an ANQP query delay. Assume that the ANQP query delay amounts to about several seconds or several milliseconds (ms).

While the STA performs the GAS request/response process on the AP 1, in a step 4, it may occur that the mobile STA moves away from an area of the AP 1 into an area of the AP 2. If the ANQP query delay time is long enough, the STA may deviate from the area of AP 1. If the STA determines that the STA itself deviates from the area of the AP 1, the STA can detect that the STA itself has entered the area of the AP 2 through an AP discovery operation.

If the following condition is met in the step 4 or the step 5, the STA can determine that the STA itself has deviated from the area of the AP 1.

Although the STA has transmitted a GAS comeback request frame to the AP 1, the STA fails to receive a GAS comeback response from the AP 1 in response to the GAS comeback request frame.

Although the STA has transmitted a management frame or a data frame other than a GAS comeback request frame to the AP 1, the STA fails to receive a corresponding response from the AP 1.

Although the STA performs an active or passive scanning, the STA fails to discover the AP 1.

It is notified by a different network that the STA has moved away from the area of the AP 1.

Although the AP 1 obtains the network information from the AS in the step 3*b*, since the STA has already moved away from the area of the AP 1, the AP 1 is unable to deliver the network information to the STA. Hence, as the STA fails to obtain the network information, in a step 6*a*, the STA can transmit a GAS initial request frame to an AP 2 to request the network information. In a step 6*b*, the AP 2 can transmit a GAS initial response frame to the STA in response to the GAS initial request frame.

Having received the GAS initial request frame from the STA, the AP 2 can transmit a GAS query information request to the advertisement server (AS) in a step 7*a*. In response to the GAS query information request, in a step 7*b*, the AS can inform the AP 2 of the GAS query information.

Moreover, in the step 6*b*, a GAS comeback delay time may be indicated by the GAS initial response frame. Hence, in a step 8*a*, the STA can transmit a GAS comeback request frame to the AP 2. In response to the GAS comeback request frame, the AP 2 can provide the STA with the network information through a GAS comeback response frame. In case that a size of the network information is large, the STA can obtain the rest of the network information through an additional GAS comeback request/response process.

According to the example shown in FIG. 8, the GAS protocol operation performed among the STA, the AP 1 and the AS fails to achieve an original goal due to the movement of the STA, thereby wasting resources. Moreover, the STA should perform the GAS protocol operation in the area of the AP 2 all over again. Thus, in order to solve a problem that a resource for the STA in the course of moving to obtain the network information is wasted, a problem that a considerable time is taken to finally obtain the network information from a timing point of requesting the network information initially and the like, a GAS protocol operation proposed by the present invention is described in detail as follows.

Figure 9:
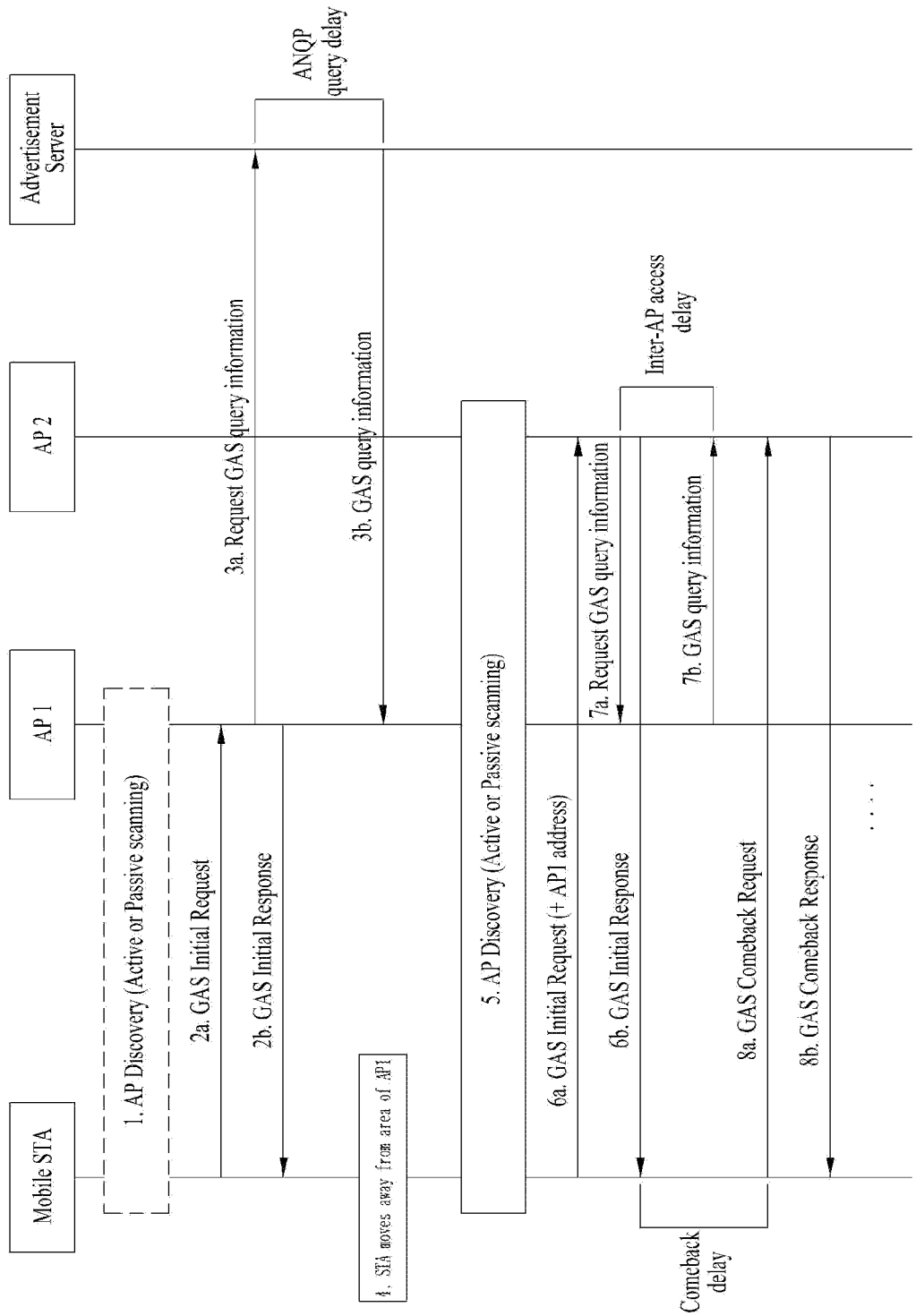
FIG. 9 is a diagram to describe an enhanced GAS protocol operation according to one example of the present invention.

FIG. 9 is a diagram to describe an enhanced GAS protocol operation according to one example of the present invention.

Since steps 1 to 5 shown in FIG. 9 are identical to the former steps 1 to 5 shown in FIG. 8, the redundant description shall be omitted.

In a step 6*a* shown in FIG. 9, an STA can transmit a GAS initial request frame to an AP 2 to request network information. In doing so, although the STA previously transmitted a GAS initial request frame to a different AP (e.g., AP 1), if the STA fails to receive the whole network information in response to the GAS initial request frame, the STA can control identification information of the previous different AP (e.g., AP 1) to be transmitted in a manner of being included in the GAS initial request frame. In this case, the identification information of the different AP may include an address of the different AP. In response to the GAS initial request frame, in a step 6*b*, the AP 2 can transmit a GAS initial response frame to the STA.

In doing so, a condition for the STA to add the identification information of the previous AP to the GAS initial request frame can be set as follows.

Through an AP discovery process, a case of knowing that a current AP (e.g., AP 2 of the example shown in FIG. 9) and an AP (e.g., AP 1 of the example shown in FIG. 9) transmitting a GAS initial request frame previously belong to the same ESS Through an AP discovery process, a case of not knowing information on ESS of each AP After the AP 2 has received the GAS initial request frame from the STA, if identification information (e.g., address of AP 1) of a specific AP is included in the GAS initial request frame, the AP 2 can transmit a GAS query information request to the specific AP in a step 7*a*. In response to the GAS query information request, the AP 1 can inform the AP 2 of the GAS query information in a step 7*b*. A time taken to perform the step 7*a* and the step 7*b* can be named an inter-AP access delay time.

On the other hand, if the identification information of the specific AP is not included in the GAS initial request frame received from the STA in the step 6*a* shown in FIG. 9, the AP 2 can transmit a GAS query information request to the AS. In response to the GAS query information request, the AS can inform the AP 2 of the GAS query information.

Moreover, in the step 6*b* shown in FIG. 9, a GAS comeback delay time may be indicated by the GAS initial response frame. Hence, in a step 8*a*, the STA can transmit a GAS comeback request frame to the AP 2. In response to the GAS comeback request frame, the AP 2 can deliver the network information to the STA through a GAS comeback response frame. In case that a size of the network information is large, the STA can obtain the rest of the network information through an additional GAS comeback request/response process.

The example shown in FIG. 9 has a big difference from the example shown in FIG. 8 in that the AP 2 receives the network information (or ANQP information) not from the AS but from the AP 1. It is highly possible that the AP 1 has already obtained the network information from the AS in accordance with the GAS query requested by the STA prior to movement. And, the inter-AP access delay is considerably shorter than the ANQP query delay. Therefore, the AP 2 can quickly obtain the network information from the AP 1. According to the example shown in FIG. 9, the STA can obtain the network information more quickly in comparison with the example shown in FIG. 8. Hence, a session setup of the STA can get faster.

Figure 10:
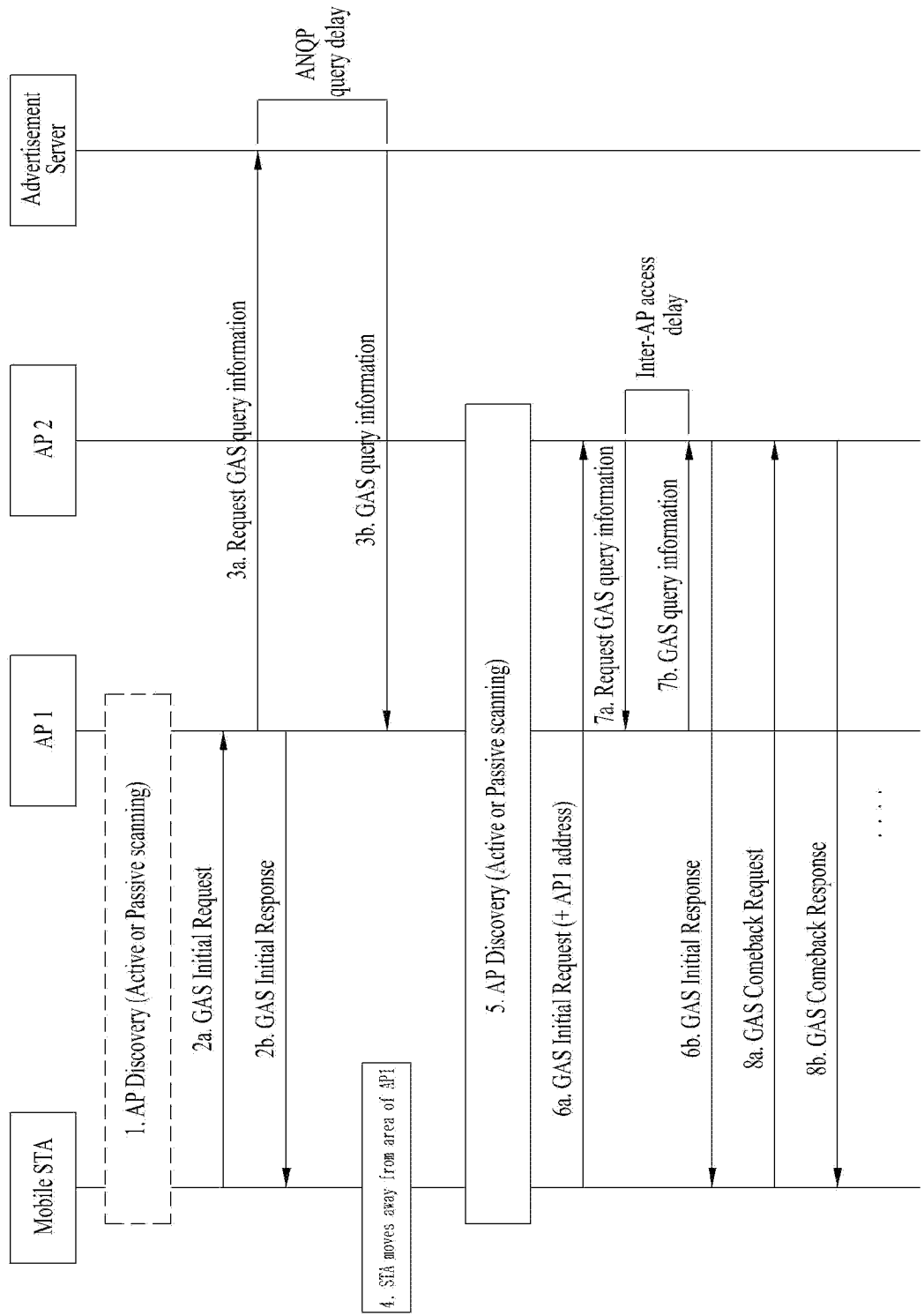
FIG. 10 is a diagram to describe an enhanced GAS protocol operation according to another example of the present invention.

FIG. 10 is a diagram to describe an enhanced GAS protocol operation according to another example of the present invention.

Since steps 1 to 5 shown in FIG. 10 are identical to the former steps 1 to 5 shown in FIG. 8, the redundant description shall be omitted.

In a step 6a shown in FIG. 10, an STA can transmit a GAS comeback request frame to an AP 2 to request network information. In doing so, although the STA previously transmitted a GAS initial request frame to a different AP (e.g., AP 1), if the STA fails to receive the whole network information in response to the GAS initial request frame, the STA can control identification information (e.g., address of AP 1) of the previous different AP (e.g., AP 1) to be transmitted in a manner of being included in the GAS comeback request frame.

After the AP 2 has received the GAS comeback request frame from the STA in the step 6a of FIG. 10, if identification information (e.g., address of AP 1) of a specific AP is included in the GAS comeback request frame, the AP 2 can transmit a GAS query information request to the specific AP in a step 7a. In response to the GAS query information request, the AP 1 can inform the AP 2 of the GAS query information in a step 7b.

Having obtained the network information from the AP 1, the PA 2 can deliver the network information to the STA through a GAS comeback response frame in a step 6b of FIG. 10.

According to the example shown in FIG. 10, if an inter-AP access delay taken for the step 7a and the step 7b is considerably shorter than a time taken for the step 6a and the step 6b (i.e., a time taken for the GAS comeback request/response frame exchange between the STA and the AP), it is applicable more advantageously.

Moreover, the example shown in FIG. 10 is different from the example shown in FIG. 9 in that the frame transceived between the STA and the AP 2 in the step 6a and the step 6b is not the GAS initial request/response frame but the GAS comeback request/response frame. In particular, the object of the GAS protocol operation for ANQP is to enable the STA to obtain the network information (or ANQP information). As the STA transmitted the GAS query information request to the AS through the AP 1 and the AS provided the GAS query information in response to the GAS query information request, it is unnecessary for the STA to perform the GAS initial request/response process on the AP 2 again. Moreover, in case that the STA makes a request for a GAS query to the AP 2, the AP 2 obtains the network information from the AP 1 and then provides the obtained network information to the STA. Hence, it may be unnecessary for the STA to perform the GAS initial request/response process. According to the example shown in FIG. 10, since an operation of exchanging the GAS initial request/response frame between the STA and the AP 2 is skipped in comparison with the example shown in FIG. 9, the STA can obtain the network information more quickly.

Figure 11:
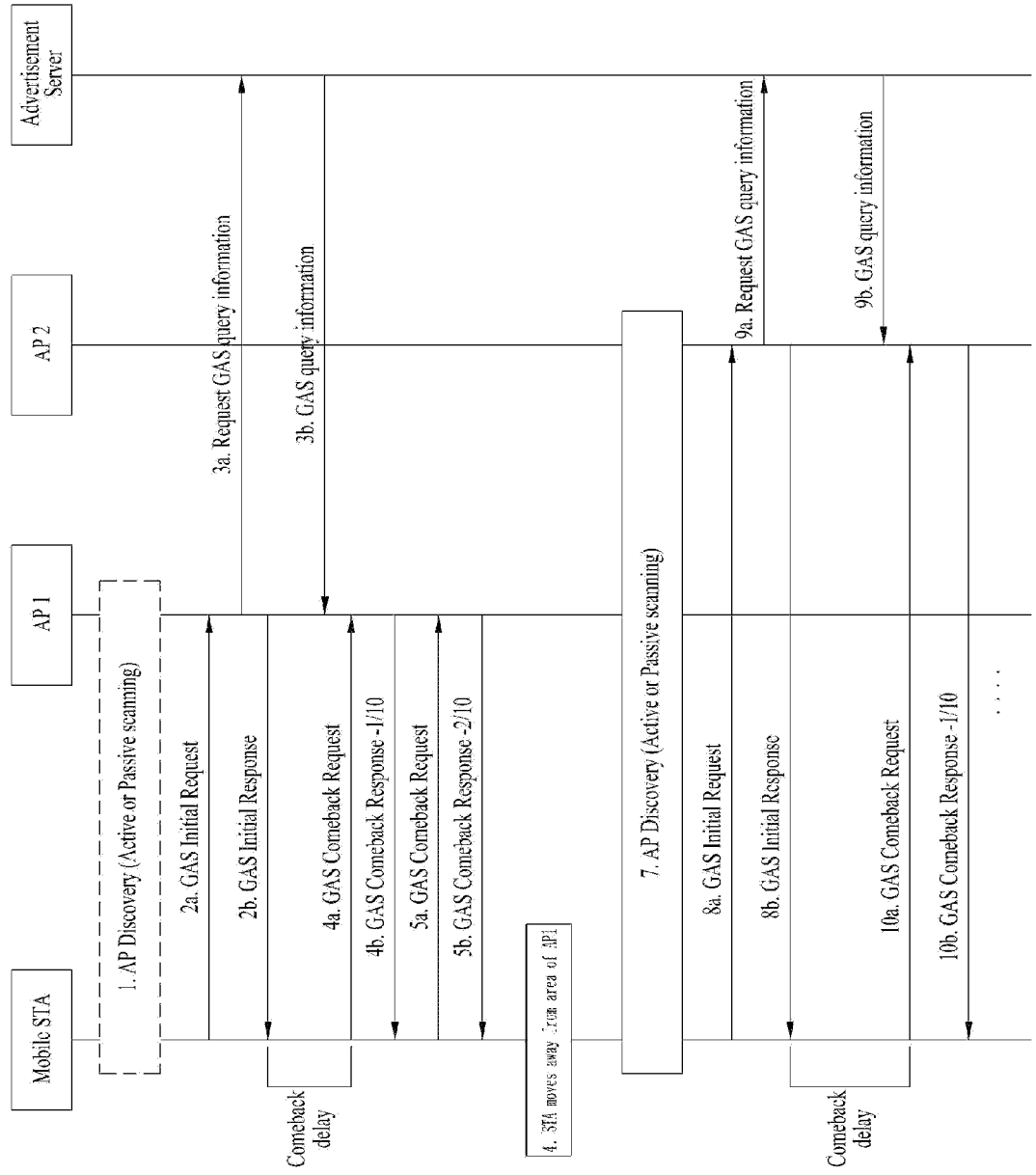
FIG. 11 is a diagram to describe another example of an existing GAS protocol operation in case that an STA moves.

FIG. 11 is a diagram to describe another example of an existing GAS protocol operation in case that an STA moves.

In a step 1 of FIG. 11, a mobile STA can detect an AP 1 through a network discovery operation (e.g., an active scanning, a passive scanning, etc.).

In a step 2a of FIG. 11, the mobile STA can transmit a GAS initial request frame to the AP 1 to request network information. In response to the GAS initial request frame, in a step 2b, the AP 1 can transmit a GAS initial response frame to the STA.

In a step 3a of FIG. 11, the AP 1 can transmit a GAS query information request (Request GAS query information) to an advertisement server (AS). Hence, in a step 3b, the AS can inform the AP 1 of a GAS query information.

A comeback delay may be indicated by the GAS initial response frame shown in the step 2b of FIG. 11. Hence, after the comeback delay, the STA can transmit a GAS comeback request frame to the AP 1 in a step 4a. In response to the GAS comeback request frame, the AP 1 can transmit a GAS comeback response frame to the STA in a step 4b.

In doing so, since a size of network information (or ANQP information) the AP 1 should deliver to the STA is large, assume that only 1/10 of the network information can be transmitted in a single GAS comeback response frame. Hence, in the step 4b, the network information delivered to the STA from the AP 1 through the GAS comeback response frame becomes a first (1/10) network information among 10.

In a step 5a of FIG. 11, a GAS comeback request frame can be transmitted to the AP 1. In a step 5b, in response to the GAS comeback request frame, a GAS comeback response frame can be received from the AP 1. Through the GAS comeback response frame of the step 5b, a second (2/10) network information among 10 is delivered.

After the first and second network information have been delivered to the STA by the AP 1, it may occur that the STA moves away from an area of the AP 1 into an area of the AP 2 like a step 6 of FIG. 11.

In a step 7 of FIG. 11, the STA can detect that the STA itself has entered the area of the AP 2 through an AP discovery operation.

In this case, the STA should perform the ANQP operation all over again. In particular, in a step 8a of FIG. 11, the STA transmits a GAS initial request frame to the AP 2 and then receives a GAS initial response frame from the AP 2 in response to the GAS initial request frame. Having received the GAS initial request frame from the STA, the AP 2 transmits a GAS query information request to the AS in a step 9a and is then able to obtain GAS query information from the AS in response to the GAS query information request. Moreover, in a step 10a, the STA can transmit a GAS comeback request frame to the AP 2 in accordance with a comeback delay included in the GAS initial response frame. In response to the GAS comeback request frame, in a step 10b, the STA can receive a GAS comeback response frame from the AP 2. In this case, a network information received by the STA becomes a first (1/10) network information among 10.

In this case, since the STA has already obtained the first and second of the network information from the AP 1 in the step 4 and the step 5, the STA should unnecessarily obtain the redundant network information again. This causes a problem of a waste of network resource and also causes a problem that a time taken for the STA to obtain the whole network information is considerably delayed. In order to solve these problems, a GAS protocol operation proposed by the present invention is described in detail as follows.

Figure 12:
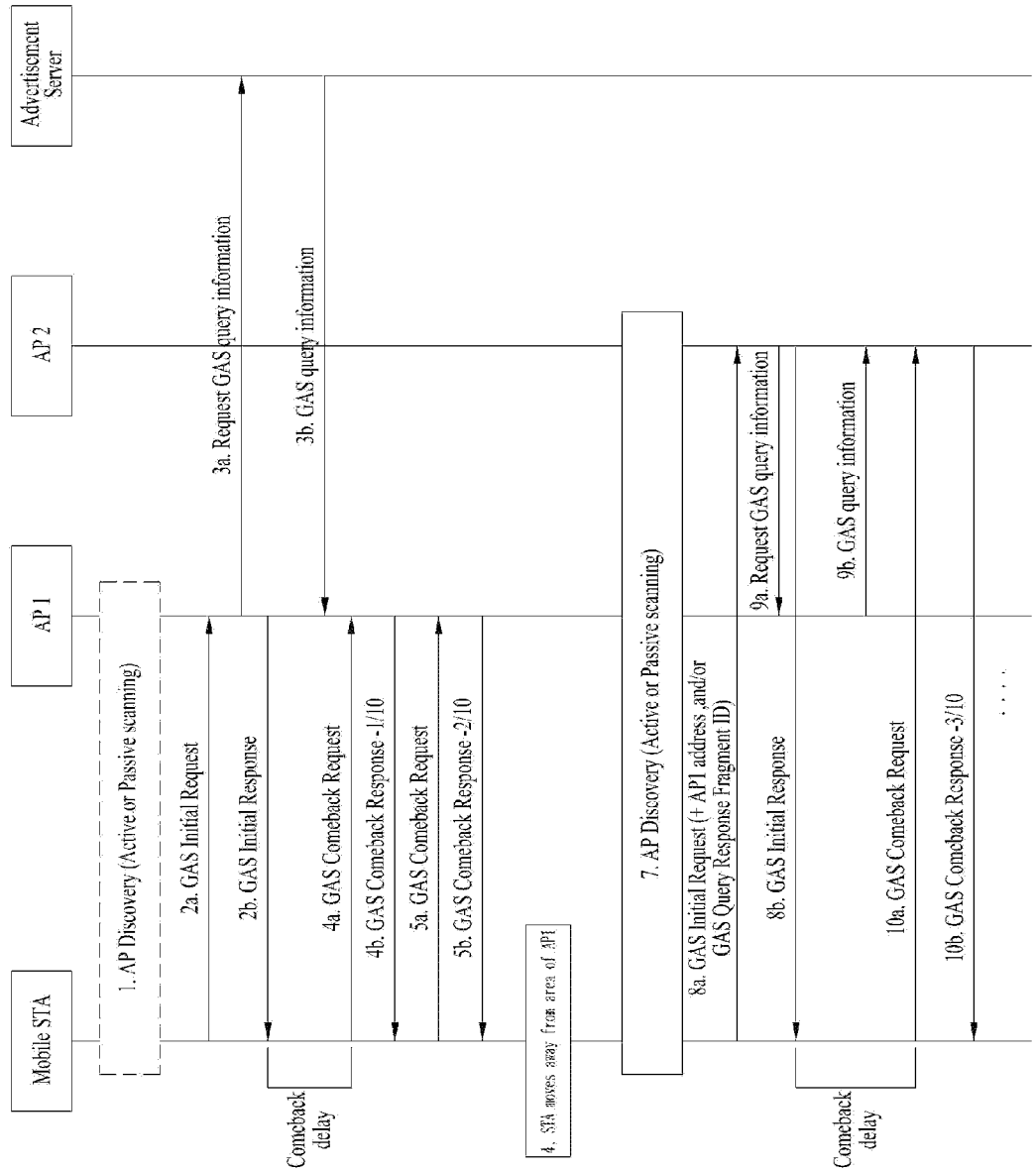
FIG. 12 is a diagram to describe an enhanced GAS protocol operation according to one example of the present invention.

FIG. 12 is a diagram to describe an enhanced GAS protocol operation according to one example of the present invention.

Since steps 1 to 7 shown in FIG. 12 are identical to the former steps 1 to 7 shown in FIG. 11, the redundant description shall be omitted.

In a step 8a shown in FIG. 12, an STA can transmit a GAS initial request frame to an AP 2 to request network information. In doing so, although the STA previously transmitted a GAS initial request frame to a different AP (e.g., AP 1), if the STA fails to receive the whole network information in response to the GAS initial request frame, the STA can control identification information (e.g., address of AP 1) of the previous different AP (e.g., AP 1) to be transmitted in a manner of being included in the GAS comeback request frame. Hence, the AP 2 can transmit a GAS query information request to the AP 1.

In doing so, after the AP 2 has made the request for the network information to the AP 1, when the AP 2 receives the network information, the AP 2 can also receive information indicating a portion of the network information transmitted so far by the AP 1. Using this information, the AP 2 can provide the network information to the STA in a manner of delivering the rest of the network information (e.g., 3/10 to 10/10 of the network information) except the network information (e.g., 1/10 and 2/10 of the network information) previously obtained by the STA (through the AP 1).

Alternatively, when the STA transmits the GAS initial request frame to the AP 2 in the step 8*a* of FIG. 12, a GAS query response fragment identification information (GAS Query Response Fragment ID) or a GAS comeback response fragment identification information (GAS Comeback Response Fragment ID) may be included. In the following description, the GAS query response fragment identification information will be named and used.

The GAS query response fragment identification information may be defined as an information element (IE) included in the GAS comeback response frame. The GAS query response fragment identification information IE may include information indicating that a current GAS comeback response frame corresponds to the nth and information indicating whether a GAS comeback response frame to be transmitted later exists. If the case shown in FIG. 12 is taken as an example, the GAS query response fragment identification information included in the GAS comeback response frame received by the STA in the step 5*b* indicates that a present GAS comeback response frame is a second GAS comeback response frame and is also able to indicate that remaining GAS comeback response frame(s) still exists. In case that the STA delivers the GAS query response fragment identification information included in the GAS comeback response frame received in the step 5*b* to the AP 2 in the step 8*a*, the AP 2 is aware that the corresponding STA previously received 2 GAS comeback response frames and is also ware that GAS comeback response frame(s) supposed to be further received by the STA exists.

In the example shown in FIG. 12, if the GAS query response fragment identification information is delivered to the AP 2, like the example shown in FIG. 11, the AP 2 can transmit a GAS query information request to the AS. In doing so, the AP 2 can request the AS to provide the STA with a portion of the necessary network information only. In this case, although a time delay may be generated more than that of a case that the AP 2 obtains the network information from the AP 1, if the remaining network information necessary for the STA is small, a time delay for obtaining a portion of the network information from the AS only may not be so great.

Alternatively, when the STA transmits the GAS initial request frame to the AP 2 in the step 8*a* of FIG. 12, the GAS query response fragment identification information can be included together with information on identification information of a previous different AP (e.g., address of AP 1). In this case, when the AP 2 transmits a GAS query information request to the AP 1 in a step 9*a* of FIG. 12, the AP 2 can request the AP 1 to provide the rest of the network information necessary for the STA only. Hence, since the rest of the necessary information except the partial information previously obtained by the STA is requested and provided only and an inter-AP access delay is taken only, a network resource waste and a time delay can be considerably reduced.

Figure 13:
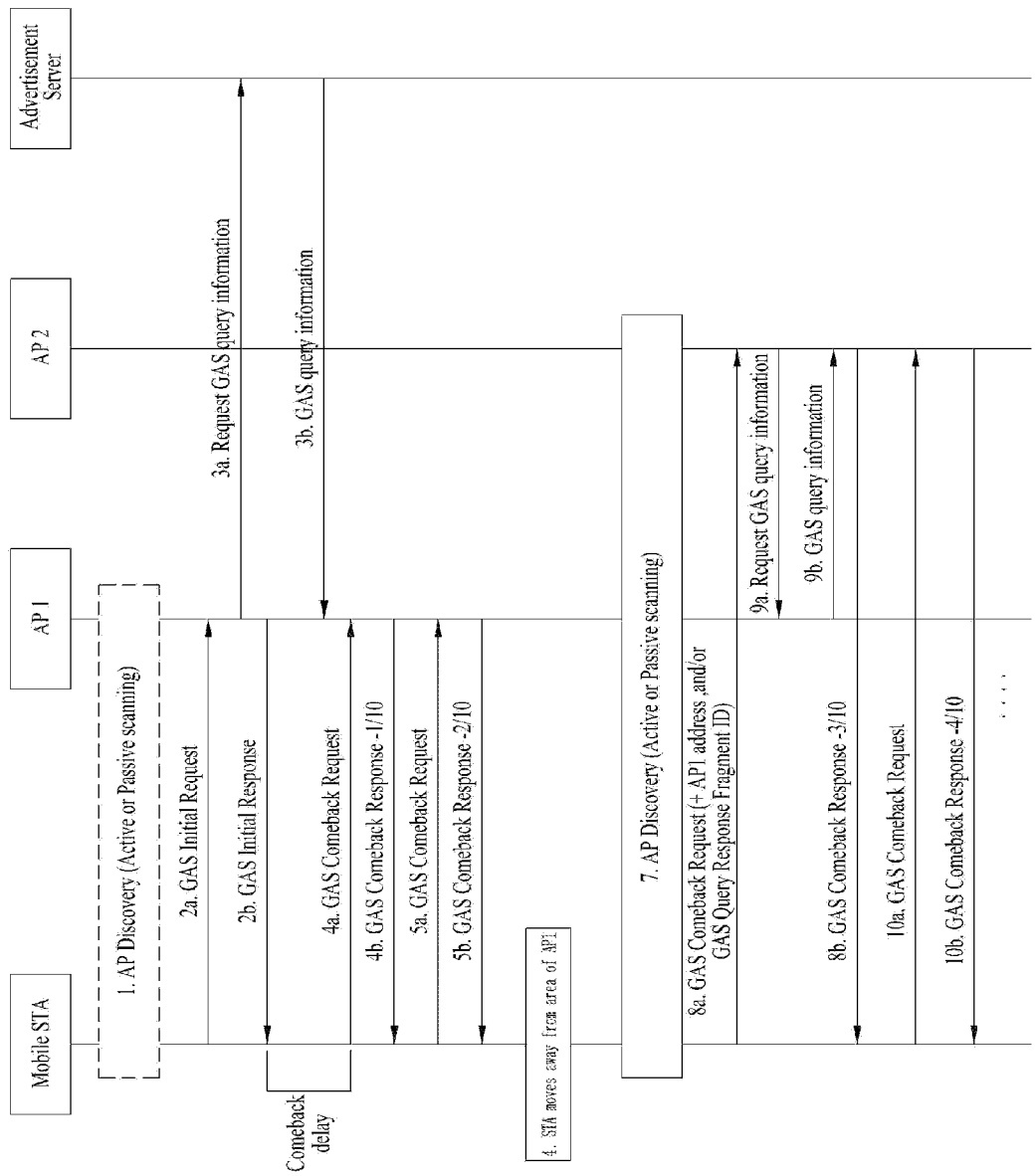
FIG. 13 is a diagram to describe an enhanced GAS protocol operation according to another example of the present invention.

FIG. 13 is a diagram to describe an enhanced GAS protocol operation according to another example of the present invention.

Since steps 1 to 7 shown in FIG. 13 are identical to the former steps 1 to 7 shown in FIG. 8, the redundant description shall be omitted.

In a step 8*a* shown in FIG. 13, an STA can transmit a GAS comeback request frame to an AP 2 to request network information. In doing so, although the STA previously transmitted a GAS initial request frame to a different AP (e.g., AP 1), if the STA fails to receive the whole network information in response to the GAS initial request frame, the STA can control at least one of identification information of the previous different AP or GAS query response fragment identification information to be transmitted in a manner of being included in the GAS comeback request frame.

After the AP 2 has received the GAS comeback request frame from the STA in the step 8*a* of FIG. 12, if identification information of a specific AP (e.g., address of AP 1) is included in the comeback request frame, the AP 2 can transmit a GAS query information request to the specific AP in a step 9*a*. In response to the GAS query information request, in a step 9*b*, the AP 1 can inform the AP 2 of the rest of network information except network information previously provided to the STA in the previous steps 4 and 5. Moreover, in case that a GAS query response fragment identification information is included in the comeback request frame only, the AP 2 may make a request for a partial network information only to the AS. In case that both of the GAS query response fragment identification information and the identification information of the AP 1 are included in the comeback request frame, the AP 2 may make a request for the rest of the network information only to the AP 1.

Having obtained the network information from the AP 1, the AP 2 can deliver the network information to the STA through a GAS comeback response frame in the step 8*b* of FIG. 13.

According to the example shown in FIG. 13, if an inter-AP access delay taken for the step 9*a* and the step 9*b* is considerably shorter than a time taken for the step 8*a* and the step 8*b* (i.e., a time taken for the GAS comeback request/response frame exchange between the STA and the AP), it is applicable more advantageously.

Moreover, the example shown in FIG. 13 is different from the example shown in FIG. 12 in that the frame transceived between the STA and the AP 2 in the step 8*a* and the step 8*b* is not the GAS initial request/response frame but the GAS comeback request/response frame. According to the example shown in FIG. 13, since an operation of exchanging the GAS initial request/response frame between the STA and the AP 2 is skipped in comparison with the example shown in FIG. 12, the STA can obtain the network information more quickly.

According to the example of the present invention mentioned in the above description, before a GAS protocol operation having started in a previous AP is completed, if the STA moves away into a different AP, at least one of previous AP identification information or GAS query response fragment identification information is provided to the different AP. According to the descriptions of the above examples, after the STA has discovered the different AP, the STA delivers at least one of the previous AP identification information or the GAS query response fragment identification information to the different AP using a GAS initial request frame or a GAS comeback request frame. Yet, the scope of the present invention is non-limited by those examples. In the process for the STA to discover the different AP (e.g., the step 5 in FIG. 9 or FIG. 10, the step 7 in FIG. 12 or FIG. 13), at least one of the previous AP identification information or the GAS query response fragment identification information may be delivered to the different AP. For instance, using a probe request frame, the STA is able to deliver at least one of the previous AP identification information or the GAS query response fragment identification information to the different AP. In doing so, an existing GAS initial request frame or an existing GAS comeback request frame is usable instead of a modified GAS initial request frame or a modified GAS comeback request frame delivered to the AP 2 by the STA according to the examples shown in FIG. 9, FIG. 10, FIG. 12 and FIG. 13.

Figure 14:
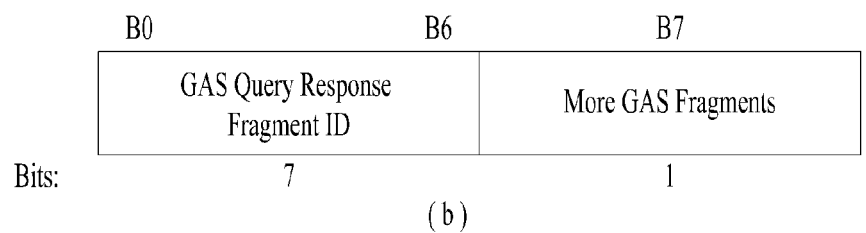
FIG. 14 is a diagram to describe a format of GAS information element proposed by the present invention.

FIG. 14 is a diagram to describe a format of GAS information element proposed by the present invention.

FIG. 14 (*a*) shows that GAS IE proposed by the present invention includes fields of an element ID, a length, a previous AP identification information (e.g., an address of a previous AP) and a GAS query response fragment ID. The GAS IE shown in FIG. 14 (*a*) may be included in a probe request frame, a GAS initial request frame or a GAS comeback request frame.

In FIG. 14 (*a*), the element ID field may be set to a value indicating that a corresponding IE is a GAS IE.

The length field may be set to a value indicating a length of the fields next to the length field.

The previous AP identification information field may include an address of an AP mentioned in the examples of the present invention, i.e., an address of an AP failing to complete a GAS protocol operation started by an STA.

The GAS query response fragment ID field is information on a GAS comeback response frame previously received by an STA. A detailed format of the GAS query response fragment ID field can be configured as shown in FIG. 14 (*b*).

Referring to FIG. 14 (*b*), a GAS query response fragment ID field is defined as a 70 bit size and may be set to a value amounting to one of 0 to 127. If an excessive response fragment exists, an STA sets a value of the GAS query response fragment ID to 0 for an initial fragment and can increment the value by 1 for each subsequent fragment.

Referring to FIG. 14 (*b*), More GAS Fragments field is set to 0 if a final fragment is transmitted. If a subsequent fragment exists, the More GAS Fragments field is set to 1. For instance, in case of a query response configured with 10 fragments, a value of the More GAS Fragments field of each of first (1/10) to ninth (9/10) fragments is set to 1 and a value of the More GAS Fragments field of a tenth (10/10) fragment is set to 0.

In the enhanced GAS operation method according to the above-mentioned proposal of the present invention, the items mentioned in the descriptions of the various embodiments of the present invention can be implemented in a manner of being independently applied or at least two of the various embodiments can be implemented in a manner of being simultaneously applied. For clarity, the redundant contents shall be omitted.

Figure 15:
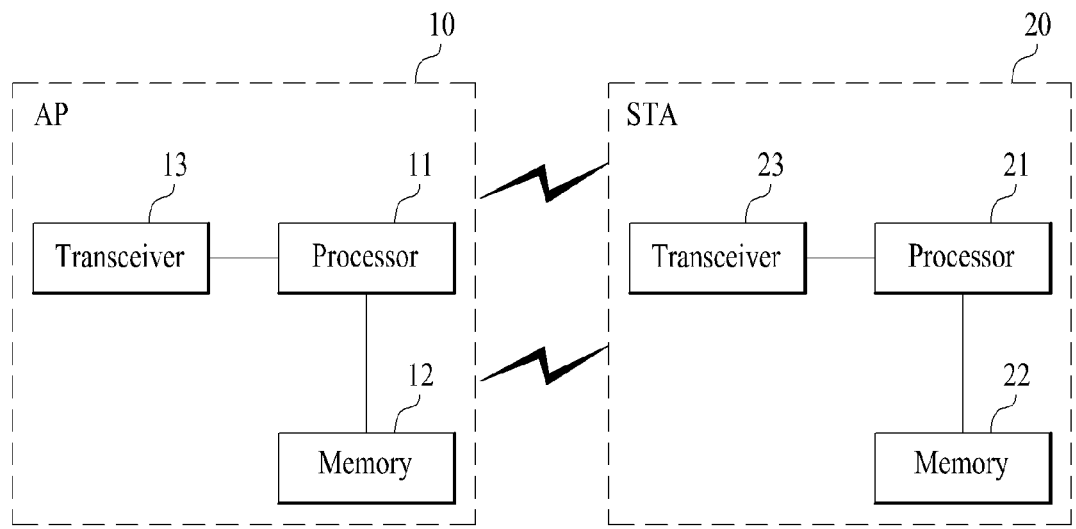
FIG. 15 is a block diagram for an exemplary configuration of a wireless device according to one embodiment of the present invention.

FIG. 15 is a block diagram for an exemplary configuration of an AP device and an STA device according to one embodiment of the present invention.

An AP 10 may include a processor 11, a memory 12 and a transceiver 13. An STA 20 may include a processor 21, a memory 22 and a transceiver 23.

The transceiver 13/23 can transmit/receive wireless signals and can implement a physical layer according to IEEE 802 system for example.

The processor 11/21 is able to implement a physical layer and/or a MAC layer according to IEEE 802 system by being connected to the transceiver 13/23. The processor 11/21 can be configured to perform an operation according to one or a combination of at least two of the various embodiments of the present invention mentioned in the foregoing description.

For instance, the processor 11 of the AP 10 may be configured to receive a frame (e.g., a probe request frame, a GAS initial request frame, a GAS comeback request frame, etc.) including at least one of identification information of a different AP or fragment identification information from the STA 20 using the transceiver 13. And, the processor 11 of the AP 10 may be configured to transmit a GAS query response information to the STA 20 using the transceiver 13. In this case, if the identification information of the different AP is included in the frame, the processor 11 of the AP 10 may be configured in a manner of obtaining the GAS query response information from the different AP and then transmitting the obtained GAS query response information to the STA 20. Moreover, if the fragment identification information included in the frame received from the STA 20 indicates that at least one subsequent GAS query response fragment exists, the processor 11 of the AP 10 can be configured to transmit the at least one subsequent GAS query response information fragment to the STA 20.

The processor 21 of the STA 20 may be configured to transmit a frame (e.g., a probe request frame, a GAS initial request frame, a GAS comeback request frame, etc.) including at least one of identification information of a previous AP or fragment identification information to a current AP (e.g., the AP 10) using the transceiver 23. And, the processor 21 of the STA 20 may be configured to receive a GAS query response information from the AP 10 using the transceiver 23. In this case, if the identification information of the previous AP is included in the frame, the processor 21 of the STA 20 may be configured to receive the GAS query response information, which was obtained from the previous AP, from the AP 10. Moreover, if the fragment identification information included in the frame transmitted to the AP 10 indicates that at least one subsequent GAS query response fragment exists, the processor 21 of the STA 20 can be configured to receive the at least one subsequent GAS query response information fragment from the AP 10.

Moreover, a module for implementing operations of the AP and STA according to the various embodiments of the present invention mentioned in the foregoing description is saved in the memory 12/22 and can be executed by the processor 11/21. The memory 12/22, which is included inside the processor 11/21 or installed outside the processor 11/21, can be connected to the processor 11/21 via a means known to the public.

The above descriptions of the AP device 10 and the STA device 20 are applicable to a base station device and a user equipment device in another wireless communication system (e.g., LTE/LTE-A system, etc.), respectively.

In the above-mentioned detailed configurations of the AP and STA devices, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided inside or outside the processor to exchange data with the processor through the various means known to the public.

Regarding the elements of the device for the AP/STA, the structure of the processor 11/21 shall be described in detail as follows.

Figure 16:
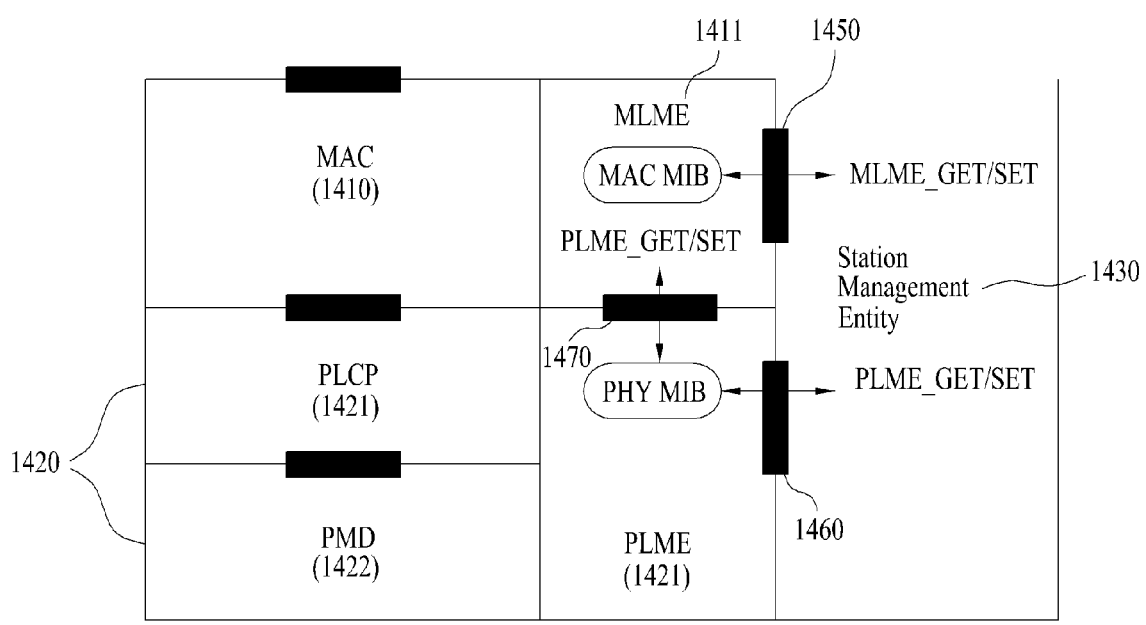
FIG. 16 illustrates an exemplary structure of a processor of a wireless device according to one embodiment of the present invention.

FIG. 16 illustrates an exemplary structure of a processor of an AP or STA device according to one embodiment of the present invention.

The processor 11/21 of the AP/STA shown in FIG. 15 may have a structure of a plurality of layers. And, FIG. 16 intensively illustrates a MAC sublayer 1410 and a physical layer 1420 on DLL (data link layer) particularly among the layers. Referring to FIG. 16, a PHY 1420 may include a PLCP (physical layer convergence procedure) entity 1421 and a PMD (physical medium dependent) entity 1422. Each of the MAC sublayer 1410 and the PHY 1420 includes a management entity conceptionally called MLME (MAC sublayer Management Entity) 1411. Such entity 1411/1421 provides a layer management service interface for operating a layer management function.

In order to provide an accurate MAC operation, SME (Station Management Entity) 1430 exists in each STA. The SME 1430 is a layer-independent entity that exists in a separate management plane or seems to be located off to the side. Although accurate functions of the SME 1430 are not described in detail in the present document, such an entity 1430 may generally seem to be responsible for a function of collecting layer-dependent states from various layer management entities (LMEs), a function of setting layer-specific parameters to similar values, and the like. The SME 1430 performs these functions on behalf of a general system management entity and can implement a standard management protocol.

The entities shown in FIG. 16 interwork with each other in various ways. FIG. 16 shows several examples of exchanging GET/SET primitives. XX-GET.request primitive is used to request a value of a given MIB attribute (management information based attribute information. XX-GET.confirm primitive is used to return an appropriate MIB attribute information value if a status is 'successful'. Otherwise, the XX-GET.confirm primitive is used to return an error indication in a status field. XX-SET.request primitive is used to request that an indicated MIB attribute is set to a given value. In case that the MIB attribute means a specific operation, it means that the corresponding operation is requested to be performed. And, XX-SET.confirm primitive confirms that an indicated MIB attribute is set to a requested value if a status is 'successful'. Otherwise, the XX-SET-.confirm primitive is used to return an error condition to a status field. If an MIB attribute means a specific operation, it confirms that the corresponding operation has been performed.

Referring to FIG. 16, the MLME 1411 and the SME 1430 can exchange various MLME_GET/SET primitives with each other through MLME_SAP 1450. Moreover, as shown in FIG. 16, various PLCM_GET/SET primitives can be exchanged through PLME_SAP 1460 between the PLME 1421 and the SME 1430, or can be exchanged through MLME-PLME_SAP 1470 between the MLME 1411 and the PLME 1470.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

INDUSTRIAL APPLICABILITY

The various embodiments of the present invention mentioned in the foregoing description are mainly explained with reference to IEEE 802.11 system and may be applicable in the same manners to various kinds of mobile communication systems.

The invention claimed is:

1. A method of a station (STA) performing high-speed link setup by in a wireless communication system, the method comprising:
   determining that the STA has moved away from an area of a previous access point (AP) before completely receiving network information from the previous AP;
   transmitting a frame to a current access point, the frame including identification information of the previous AP and identification information of the network information; and
   receiving a response frame from the current AP, the response frame including remaining network information other than the network information already received.

2. The method of claim 1, further comprising:
   transmitting a generic advertisement service (GAS) initial request frame to the previous AP before the STA discovers the current AP; and
   receiving a GAS initial response frame from the previous AP.

3. The method of claim 1, wherein determining that the STA has moved away from the area of the previous AP comprises determining that:
   the STA failed to receive a generic advertisement service (GAS) comeback response frame in response to a GAS comeback request frame transmitted by the STA to the previous AP;
   the STA failed to receive a response to a management frame or a data frame transmitted by the STA to the previous AP;
   the STA failed to discover the previous AP through active scanning or passive scanning; or
   the STA is notified by a network that the STA has moved away from the area of the previous AP.

4. The method of claim 1, wherein the identification information of the previous AP comprises an address of the previous AP.

5. The method of claim 1, wherein the identification information includes generic advertisement service (GAS) query response fragment identification information received by the STA from the previous AP.

6. The method of claim 1, wherein the frame comprises a probe request fame, a generic advertisement service (GAS) initial request frame, or a GAS comeback request frame.

7. The method of claim 1, wherein the current AP and the previous AP belong to a same extension service set (ESS).

8. The method of claim 1, wherein the response frame further includes Access Network Query Protocol (ANQP) information.

9. A method of an access point (AP) supporting high-speed link setup for a station (STA) in a wireless communication system, the method comprising:
   receiving a frame from the STA, the frame including identification information of a previous access point (AP) and identification information of network information;
   transmitting generic advertisement service (GAS) query request information to the previous AP;
   receiving GAS query response information from the previous AP in response to the GAS query request information, the GAS query response information including network information and information indicating a portion of the network information transmitted to the STA by the previous AP; and
   transmitting a response frame to the STA, the response frame including remaining network information other than the network information already received by the STA from the previous AP.

10. A station (STA) performing high-speed link setup in a wireless communication system, the STA comprising:
   a transceiver; and
   a processor configured to:
   determine that the STA has moved away from an area of a previous access point (AP) before completely receiving network information from the previous AP;
   control the transceiver to transmit a frame to a current access point, the frame including identification information of the previous AP and identification information of the network information; and
   control the transceiver to receive a response frame from the current AP, the response frame including remaining network information other than the network information already received.

11. The STA of claim 10, wherein determining that the STA has moved away from the area of the previous AP comprises determining that:
   the STA failed to receive a generic advertisement service (GAS) comeback response frame in response to a GAS comeback request frame transmitted by the STA to the previous AP;
   the STA failed to receive a response to a management frame or a data frame transmitted by the STA to the previous AP;
   the STA failed to discover the previous AP through active scanning or passive scanning; or
   the STA is notified by a network that the STA has moved away from the area of the previous AP.

12. The STA of claim 10, wherein the processor is further configured to:
   control the transceiver to transmit a generic advertisement service (GAS) initial request frame to the previous AP before the STA discovers the current AP; and
   control the transceiver to receive a GAS initial response frame from the previous AP.

13. The STA of claim 10, wherein the identification information of the previous AP comprises an address of the previous AP.

14. The STA of claim 10, wherein the identification information of the network information includes generic advertisement service (GAS) query response fragment identification information received by the STA from the previous AP.

15. The STA of claim 10, wherein the frame comprises a probe request fame, a generic advertisement service (GAS) initial request frame, or a GAS comeback request frame.

16. The STA of claim 10, wherein the current AP and the previous AP belong to a same extension service set (ESS).

17. The method of claim 10, wherein the response frame further includes Access Network Query Protocol (ANQP) information.

18. The STA of claim 10, wherein the identification information of the previous AP comprises an address of the previous AP.

19. An access point (AP) supporting high-speed link setup of a station (STA) in a wireless communication system, the AP comprising:
   a transceiver; and
   a processor configured to:
   control the transceiver to receive a frame from the STA, the frame including identification information of a previous access point (AP) and identification information of network information;
   control the transceiver to transmit generic advertisement service (GAS) query request information to the previous AP;
   control the transceiver to receive GAS query response information from the previous AP in response to the GAS query request information, the GAS query response information including network information and information indicating a portion of the network information transmitted to the STA by the previous AP; and
   control the transceiver to transmit a response frame to the STA, the response frame including remaining network information other than the network information already received by the STA from the previous AP.

20. The AP of claim 19, wherein the response frame further includes Access Network Query Protocol (ANQP) information.

* * * * *